(12) United States Patent
Li et al.

(10) Patent No.: US 12,052,704 B2
(45) Date of Patent: Jul. 30, 2024

(54) MECHANISM FOR SSB TRANSMISSION IN NR-U

(71) Applicant: InterDigital Patent Holdings, Inc., Wilmington, DE (US)

(72) Inventors: Yifan Li, Conshohocken, PA (US); Lakshmi R. Iyer, King of Prussia, PA (US); Allan Y. Tsai, Boonton, NJ (US); Qing Li, Princeton Junction, NJ (US); Mohamed Awadin, Plymouth Meeting, PA (US); Joseph M. Murray, Schwenksville, PA (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/051,297

(22) PCT Filed: May 9, 2019

(86) PCT No.: PCT/US2019/031545
§ 371 (c)(1),
(2) Date: Oct. 28, 2020

(87) PCT Pub. No.: WO2019/217697
PCT Pub. Date: Nov. 14, 2019

(65) Prior Publication Data
US 2021/0051683 A1    Feb. 18, 2021

Related U.S. Application Data

(60) Provisional application No. 62/669,613, filed on May 10, 2018.

(51) Int. Cl.
*H04W 72/12*    (2023.01)
*H04L 5/00*    (2006.01)
(Continued)

(52) U.S. Cl.
CPC .......... *H04W 72/12* (2013.01); *H04L 5/0048* (2013.01); *H04L 41/0806* (2013.01);
(Continued)

(58) Field of Classification Search
CPC ..... H04L 27/26; H04L 5/0023; H04L 5/0091; H04L 5/0032; H04L 5/0048;
(Continued)

(56) References Cited

U.S. PATENT DOCUMENTS

| 10,091,659 B2 | 10/2018 | Ng et al. |
| 2013/0010707 A1 | 1/2013 | Gaal et al. |

(Continued)

FOREIGN PATENT DOCUMENTS

| CN | 103283291 A | 9/2013 |
| CN | 105122715 A | 12/2015 |

(Continued)

OTHER PUBLICATIONS

Convida Wireless: "Design Considerations for SSB in NR-U", 3GPP Draft, R1-1807225, May 12, 2018.
(Continued)

*Primary Examiner* — Yee F Lam
(74) *Attorney, Agent, or Firm* — Flaster Greenberg, P.C.

(57) ABSTRACT

The present application is directed to an apparatus including a non-transitory memory including instructions stored thereon for monitoring synchronous signals and physical broadcast channels (SSBs) from a network node. The apparatus also includes a processor, operably coupled to the non-transitory memory, configured to execute a set of instructions. The instructions include configuring the apparatus for a STTC (SSB Transmission Timing Configuration). The STTC is a time interval with plural locations accommodating transmission of the SSBs. The instructions also include monitoring the STTC for the SSBs. The instructions
(Continued)

further include determining a first one of the SSBs in a first slot of a subframe in a scheduled SSB transmission in the STTC has been transmitted at a first scheduled location, where the transmission of the first one of the SSBs is based upon confirmation of a successful Listen Before Talk (LBT) available channel prior to the scheduled SSB transmission in the STTC.

20 Claims, 31 Drawing Sheets

(51) Int. Cl.
   *H04L 41/0806* (2022.01)
   *H04W 56/00* (2009.01)
   *H04W 72/30* (2023.01)
   *H04W 74/08* (2024.01)
(52) U.S. Cl.
   CPC ......... *H04W 56/001* (2013.01); *H04W 72/30* (2023.01); *H04W 74/08* (2013.01)
(58) Field of Classification Search
   CPC ...... H04L 5/0082; H04L 5/14; H04J 11/0073; H04J 11/0076; H04W 16/14; H04W 56/0015; H04W 74/0808; H04W 48/16
   See application file for complete search history.

(56) References Cited

U.S. PATENT DOCUMENTS

| | | | |
|---|---|---|---|
| 2014/0301305 A1 | 10/2014 | Xu et al. | |
| 2015/0350941 A1* | 12/2015 | You | H04W 84/045 370/252 |
| 2017/0048919 A1 | 2/2017 | Gaal et al. | |
| 2017/0331577 A1 | 11/2017 | Parkvall et al. | |
| 2017/0367120 A1 | 12/2017 | Murray et al. | |
| 2018/0241494 A1* | 8/2018 | Chendamarai Kannan | H04L 5/0048 |
| 2018/0241526 A1* | 8/2018 | Chendamarai Kannan | H04B 7/0695 |
| 2018/0242232 A1* | 8/2018 | Chendamarai Kannan | H04W 72/0453 |
| 2018/0316454 A1* | 11/2018 | Damnjanovic | H04W 16/14 |
| 2019/0037481 A1* | 1/2019 | Zhang | H04W 48/16 |
| 2019/0037508 A1* | 1/2019 | Sun | H04J 11/0069 |
| 2019/0069256 A1* | 2/2019 | Jung | H04W 56/0015 |
| 2019/0132170 A1* | 5/2019 | Si | H04L 27/26025 |
| 2019/0191457 A1* | 6/2019 | Si | H04W 48/12 |
| 2019/0239083 A1* | 8/2019 | Raghothaman | H04W 74/0808 |
| 2019/0246410 A1* | 8/2019 | Zhang | H04W 72/0446 |
| 2019/0306832 A1* | 10/2019 | Si | H04W 72/30 |
| 2020/0178288 A1* | 6/2020 | Chang | H04W 76/27 |
| 2021/0045144 A1* | 2/2021 | Kim | H04L 5/0053 |

FOREIGN PATENT DOCUMENTS

| | | |
|---|---|---|
| CN | 107580791 A | 1/2018 |
| CN | 107852317 A | 3/2018 |
| WO | 2017/083542 A2 | 5/2017 |
| WO | WO 2017136458 A2 | 8/2017 |

OTHER PUBLICATIONS

Nokia et al: "Potential solutions and techniques for NR unlicensed", 3GPP Draft, R1-1802526, Feb. 16, 2018.
Oppo: "SS/PBCH block transmission on NR-U", 3GPP Draft, R1-1803977, Apr. 15, 2018.
Huawei et al., "SS/PBCH block design in NR unlicensed", R1-1803680, Apr. 2018, 3GPP TSG RAN WG1 Meeting #92bis, pp. 4.
ZTE et al., "Considerations on RS/channel design and measurement for NR-U", 3GPP TSGRAN WG1 Meeting #92bis, R1-1803951, Apr. 2018, pp. 10.
Third Generation Partnership Project (3GPP), "Physical Layer Procedures", Technical Specification Group Radio Access Network; Evolved Universal Terrestrial Radio Access (E-UTRA); Release 13, 3GPP TS 36.213 V13.9.0, Mar. 2018, 395 pages.
Third Generation Partnership Project (3GPP), "Physical Layer Procedures", Technical Specification Group Radio Access Network; Evolved Universal Terrestrial Radio Access (E-UTRA); Release 14, 3GPP TS 36.213 V14.6.0, Mar. 2018, 466 pages.
Third Generation Partnership Project (3GPP), "Physical Layer Procedures", Technical Specification Group Radio Access Network; Evolved Universal Terrestrial Radio Access (E-UTRA); 3GPP TS 36.213 V15.1.0, Mar. 2018, 499 pages.
Third Generation Partnership Project (3GPP), "Revised SID on NR-based Access to Unlicensed Spectrum", Qualcomm Inc., 3GPP TSG RAN Meeting #77, Sapporo, Japan, Sep. 11-14, 2017, RP-172021, 5 pages.

* cited by examiner

MECHANISM FOR SSB TRANSMISSION IN NR-U

CROSS-REFERENCE TO RELATED APPLICATIONS

This application is the National Stage of International Application No. PCT/US2019/031545, filed May 9, 2019, which claims the benefit of priority of U.S. Provisional Application Ser. No. 62/669,613 filed May 10, 2018, the contents of which is incorporated by reference in its entirety herein.

FIELD

The present application is directed to mechanisms for synchronous signal and physical broadcast channel (SSB) transmission in new radio unlicensed (NR-U).

BACKGROUND

In NR, the SSB carries the essential signal and information such as the primary synchronization signal (PSS), secondary synchronization signal (SSS) and Physical Broadcast Channel (PBCH). These are used by a UE to get synchronization and Master Information Block (MIB) in both the initial cell search and connected state. If a UE cannot detect the SSB, the UE will have critical issues and will not be able to function in the NR system.

In NR-U, the gNB may not be able to transmit the SSB burst set on the pre-defined/configured location. This may be due to the LBT failure (channel is not available). This causes issues for UEs to detect SSB.

What is desired in the art are mechanisms to improve the reliability of SSB transmission in NR-U.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to mechanisms for SSB transmission in NR-U.

One aspect of the application is directed to an apparatus including a non-transitory memory including instructions stored thereon for monitoring SSBs from a network node. The apparatus also includes a processor, operably coupled to the non-transitory memory, configured to execute a set of instructions. The instructions include configuring the apparatus for a SSB Transmission Timing Configuration (STTC). The STTC is a time interval with plural locations accommodating transmission of the SSBs. The instructions also include monitoring the STTC for the SSBs. The instructions further include determining a first one of the SSBs in a first slot of a subframe in a scheduled SSB transmission in the STTC has been transmitted at a first scheduled location, where the transmission of the first one of the SSBs is based upon confirmation of a successful Listen Before Talk (LBT) available channel prior to the scheduled SSB transmission in the STTC.

Another aspect of the application is directed to an apparatus including a non-transitory memory including instructions stored thereon for transmitting SSBs. The apparatus also includes a processor, operably coupled to the non-transitory memory, configured to execute a set of instructions. The STTC is a time interval with plural locations accommodating transmission of the SSBs. The instructions include performing a LBT check on a channel. The instructions also include determining, based on the LBT check, availability of the channel, where the availability is established in a first slot of a subframe prior to a scheduled SSB transmission in the STTC at a first scheduled location. The instructions further include transmitting a first one of the SSBs in the first slot during the scheduled SSB transmission in the STTC at the first scheduled location.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1A:
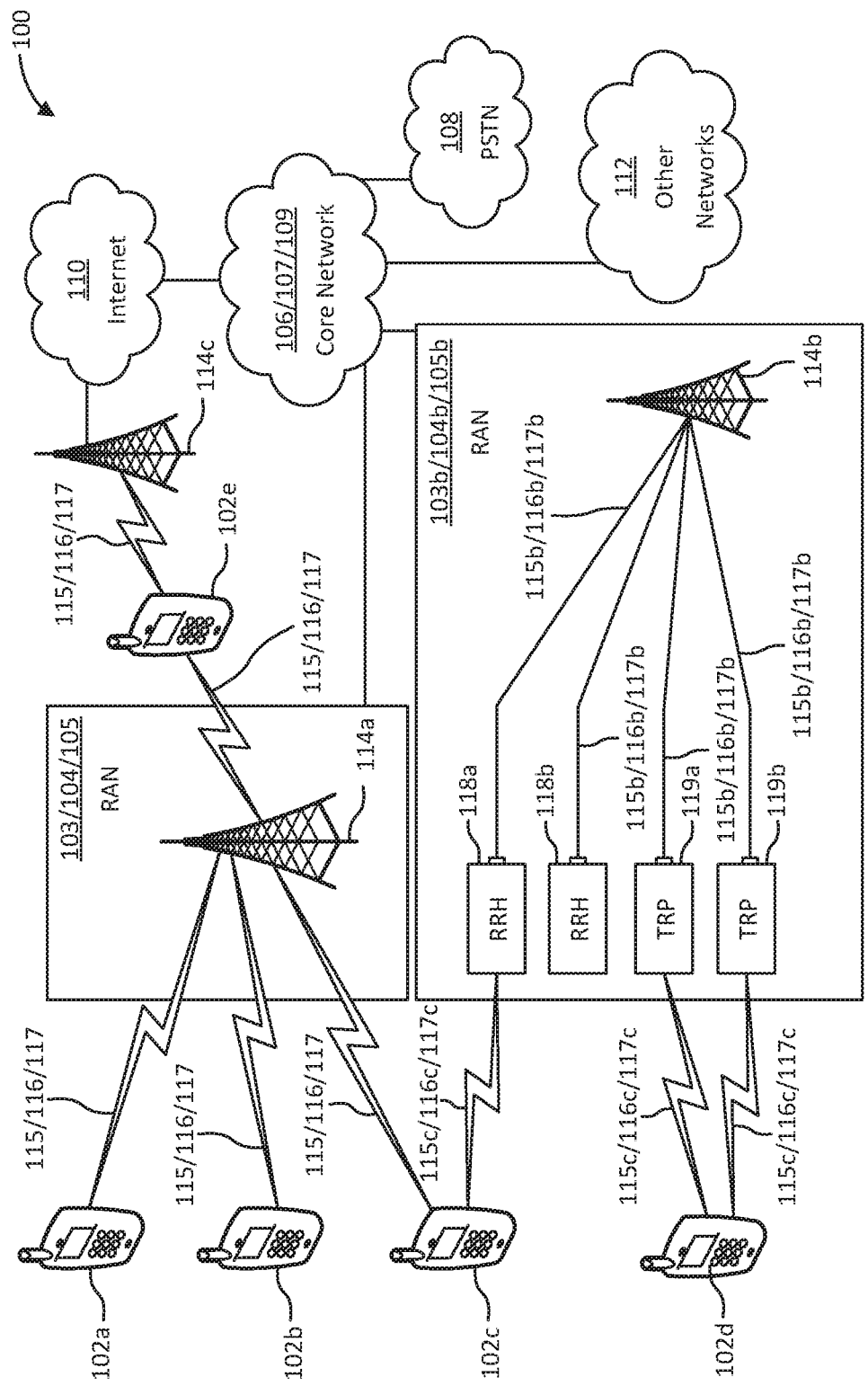
FIG. 1A illustrates an exemplary communications system according to an embodiment of the application.

A detailed description of the illustrative embodiments will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

According to one aspect of the application, mechanisms and procedures for a gNB to transmit the SSB in NR-U are envisaged. In another aspect of the application, mechanisms and procedures for a UE to detect the SSB in NR-U are envisaged. In an embodiment, several SSB transmissions may be bundled together. If the bundle cannot be transmitted at the configured location due to LBT failure, it may be shifted within a configured transmission window.

In another embodiment, beam-based LBT may be performed for each SSB. The SSBs with a successful LBT will be transmitted. For the failed LBTs, the gNB may perform another round(s) of LBT to determine whether the associated SSBs can be transmitted.

In yet another embodiment, SSB transmission may be performed in succession, i.e., one by one. A window is applied for each SSB's transmission to improve reliability.

In yet even another embodiment, the index order carried by SSB may be flexible. The SSB may be transmitted at any SSB location with successful beam base LBT within the SSB burst transmission.

It is further envisaged in this application the offset by which the SSB has shifted can be indicated by the gNB to a UE with one of the following exemplary schemes:
 (i) by the payload of PBCH;
 (ii) By the PBCH DMRS;
 (iii) Jointly by the payload of PBCH and PBCH DMRS;
 (iv) By the spreading code; and
 (v) By RMSI.

Definitions and Acronyms

Provided below are definitions for terms and phrases commonly used in this application in Table 1.

TABLE 1

| Acronym | Term or Phrase |
| --- | --- |
| BWP | Bandwidth Part |
| CA | Carrier Aggregation |
| CE | Control Element |
| CORESET | Control Resource Set |
| C-RNTI | Cell Radio-Network Temporary Identifier |
| CSI-RS | Channel State Information Reference Signal |
| DC | Duel Connectivity |
| DL | Downlink |
| DL-SCH | Downlink Shared Channel |
| eMBB | enhanced Mobile Broadband |
| FDD | Frequency-Division Duplex |
| FFS | For Further Study |
| gNB | NR NodeB |
| HARQ | Hybrid Automatic Repeat Request |
| KPI | Key Performance Indicators |
| L1 | Layer 1 |
| L2 | Layer 2 |
| L3 | Layer 3 |
| LAA | License Assisted Access |
| LTE | Long Term Evolution |
| MAC | Medium Access Control |
| MCG | Master Cell Group |
| MIB | Master Information Block |
| MTC | Machine Type Communication |
| mMTC | Massive Machine Type Communication |
| NR | New Radio |
| OFDM | Orthogonal Frequency Division Multiplexing |
| PCell | Primary Cell |
| PHY | Physical Layer |
| PRACH | Physical Random Access Channel |
| RACH | Random Access Channel |
| RAN | Random Access Network |
| RRC | Radio Resource Control |
| RRM | Radio Resource Monitoring |
| RSRP | Radio Resource Mapping |
| RSRQ | Reference Signal Received Quality |
| SCell | Secondary Cell |
| SCG | Secondary Cell Group |
| SI | System Information |
| SIB | System Information Block |
| SS | Synchronization Signal |
| TDD | Time-Division Duplex |
| UE | User Equipment |
| UL | Uplink |
| UL-SCH | Uplink Shared Channel |
| URLLC | Ultra-Reliable and Low Latency Communication |

General Architecture

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called NR, which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1A-E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b* and/or TRPs 119*a*, 119*b* may communicate with one or more of the WTRUs 102*c*, 102*d* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology.

In an embodiment, the base station 114*a* in the RAN 103/104/105 and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*e*, may implement a radio technology such as IEEE 802.11 to establish a wireless local area network (WLAN). In an embodiment, the base station 114*c* and the WTRUs 102*d*, may implement a radio technology such as IEEE 802.15 to establish a wireless personal area network (WPAN). In yet an embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d*, and 102*e* may include multiple transceivers for communicating with different wireless networks over different wireless links. For example, the WTRU 102*e* shown in FIG. 1A may be configured to communicate with the base station 114*a*, which may employ a cellular-based radio technology, and with the base station 114*c*, which may employ an IEEE 802 radio technology.

Figure 1B:
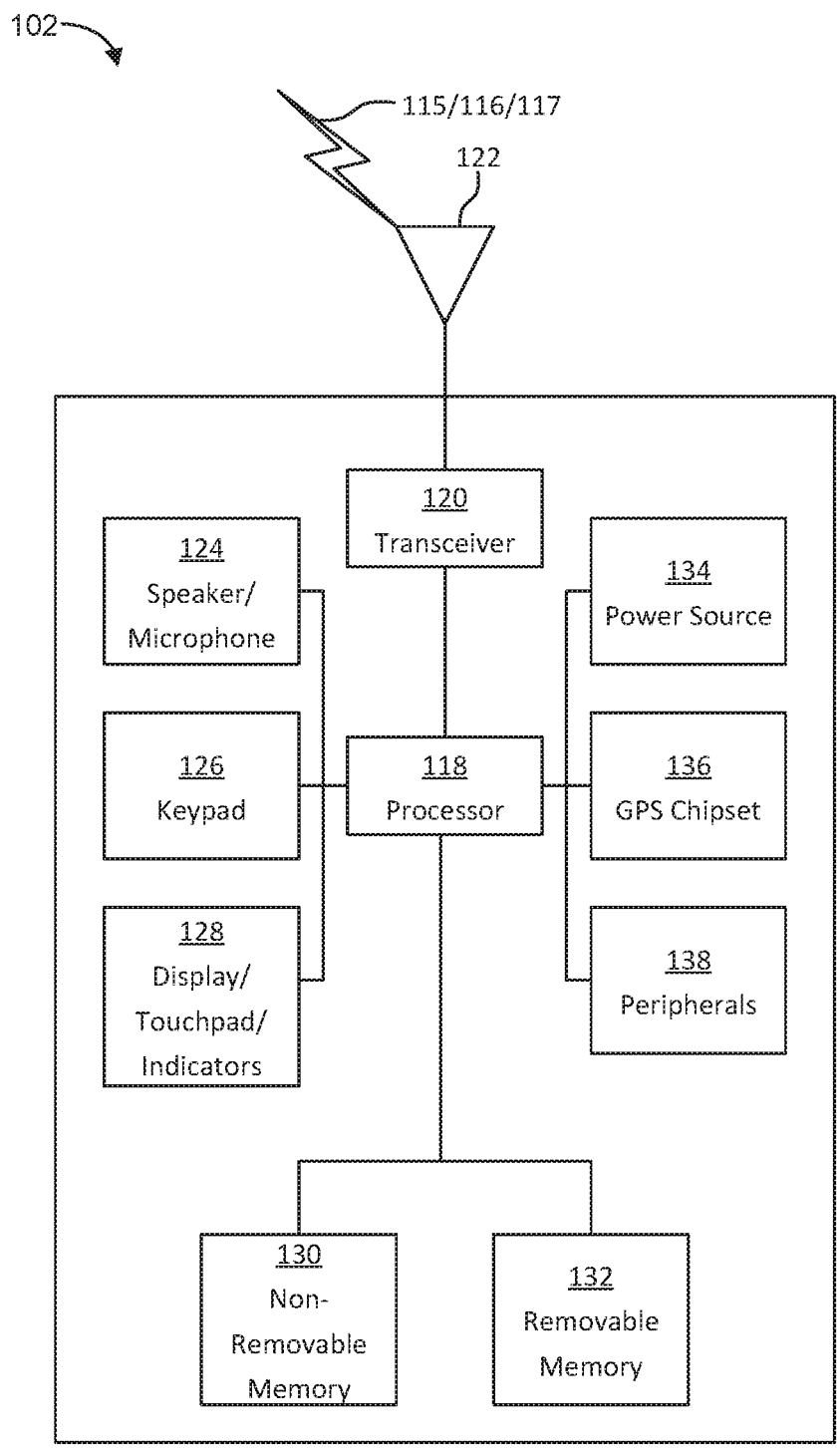
FIG. 1B illustrates an exemplary apparatus configured for wireless communication according to an embodiment of the application.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/ microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
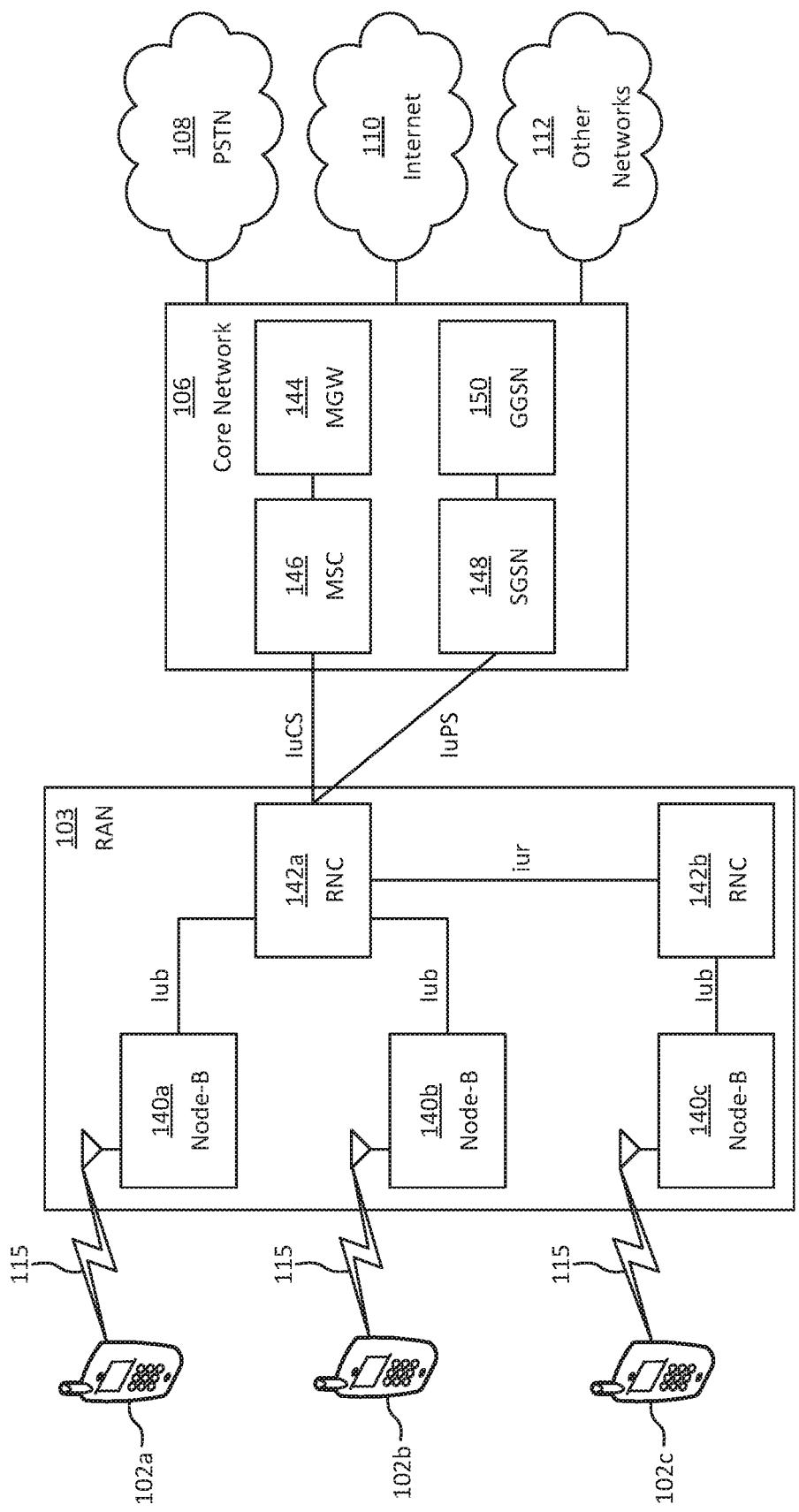
FIG. 1C illustrates a system diagram of a radio access network and a core network according to an embodiment of the application.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
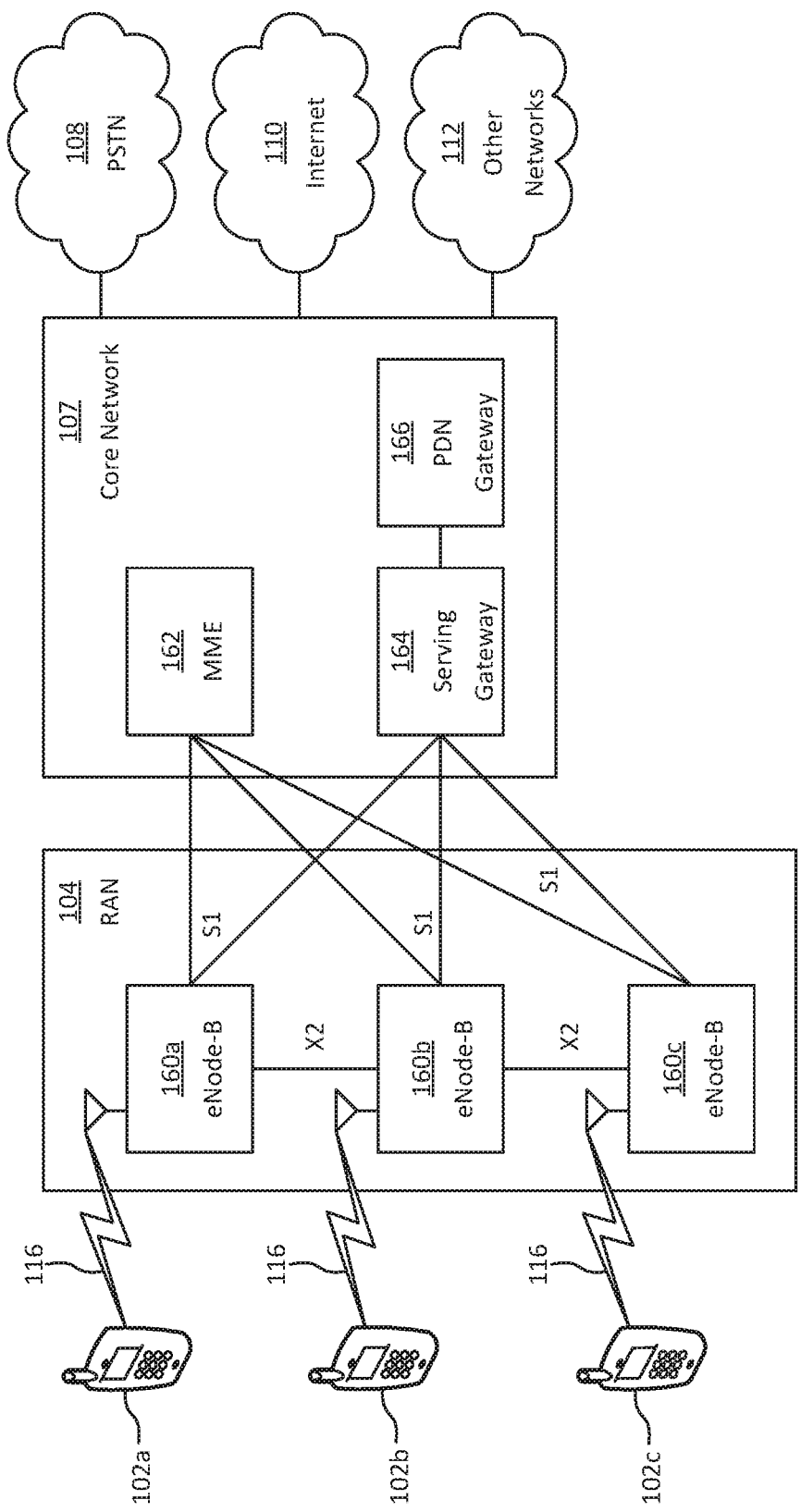
FIG. 1D illustrates a system diagram of a radio access network and a core network according to another embodiment of the application.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102cover the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
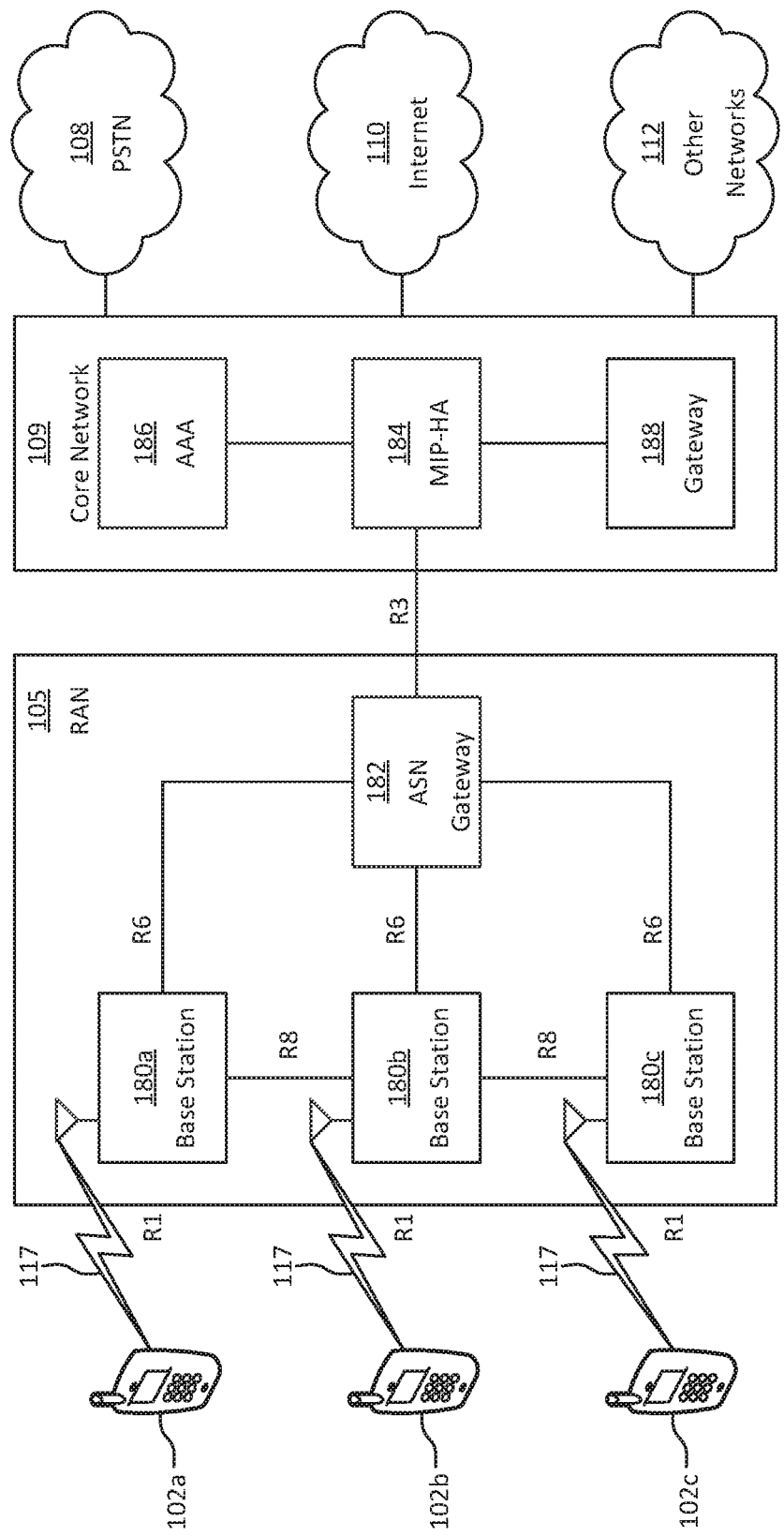
FIG. 1E illustrates a system diagram of a radio access network and a core network according to yet another embodiment of the application.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102*b*, 102*c* between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

FIG. 10F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). One example of the GUI is shown in FIG. 25. Display 86 may be implemented with a CRT-based video display, an LCD-based flat-panel display, gas plasma-based flat-panel display, or a touch-panel. Display controller 96 includes electronic components required to generate a video signal that is sent to display 86.

Still further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

Unlicensed Spectrum in LTE

As specified in 3GPP TS 36.213, Physical Layer Procedures, for Release 13 and Release 14, Licensed-assisted access (LAA) targets the carrier aggregation (CA) operation in which one or more low power secondary cells (SCells) operate in unlicensed spectrum in sub 6 GHz. LAA deployment scenarios encompass scenarios with and without macro coverage, both outdoor and indoor small cell deployments, and both co-location and non-co-location (with ideal backhaul) between licensed and unlicensed carriers, as shown in FIGS. 2A-D.

Figure 2A:
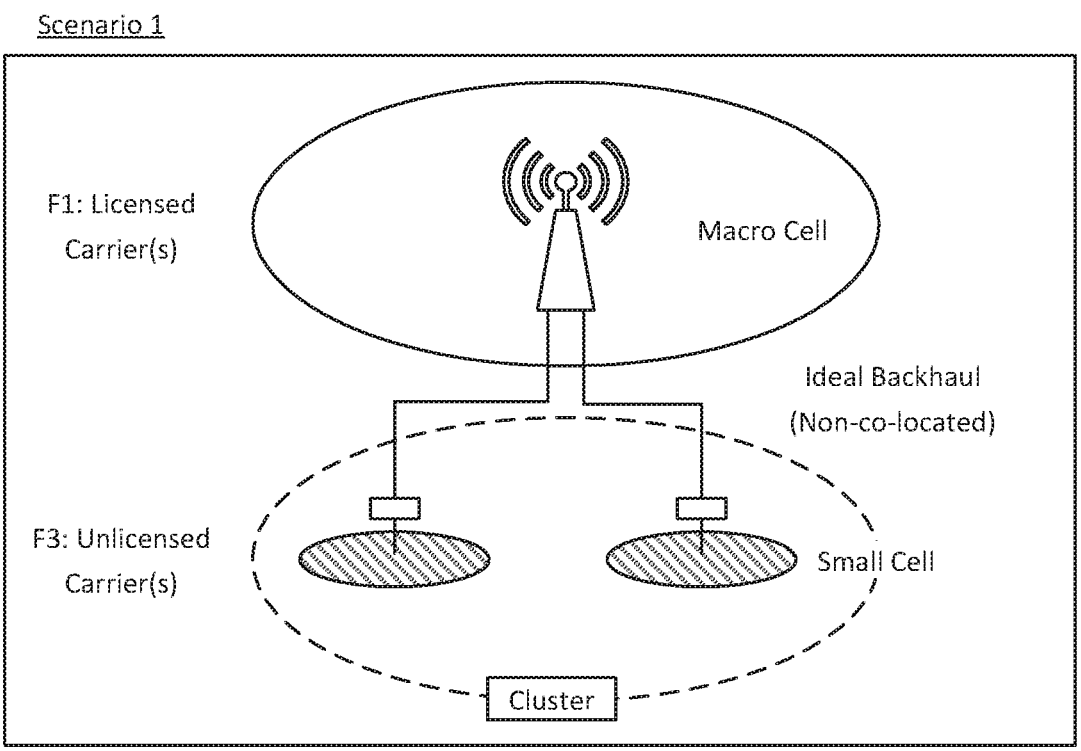
FIGS. 2A-2D illustrate LAA deployment scenarios.
Figure 2B:
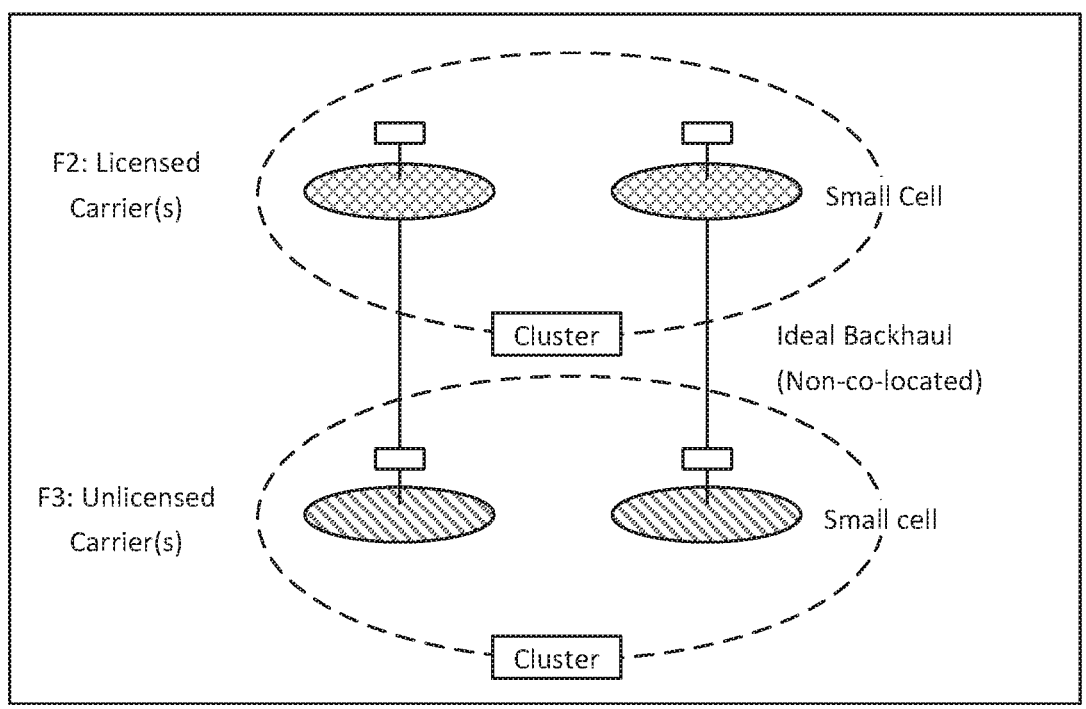
Figure 2C:
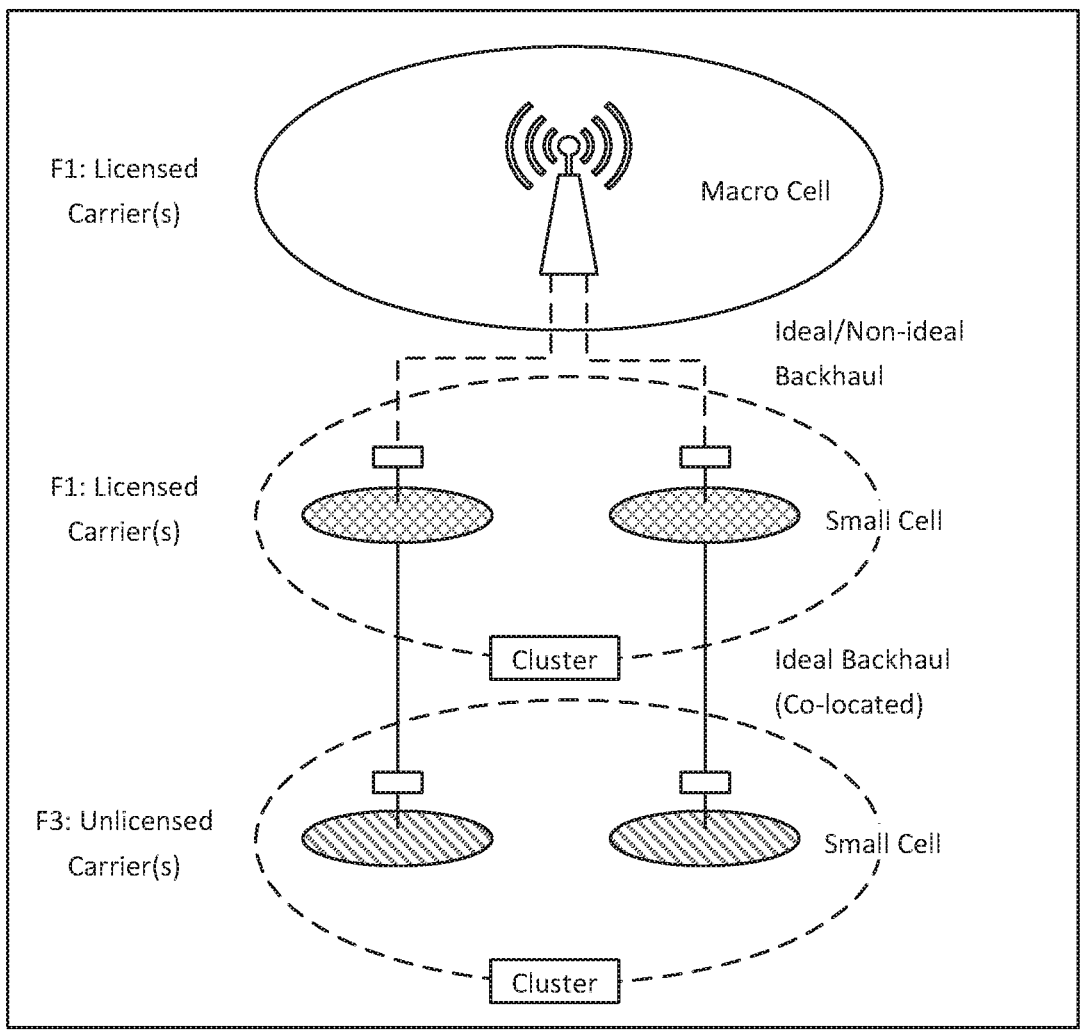

Scenario 1 of FIG. 2A depicts carrier aggregation between licensed macro cell (F1) and unlicensed small cell (F3). Meanwhile, scenario 2 of FIG. 2B depicts carrier aggregation between licensed small cell (F2) and unlicensed small cell (F3) without macro cell coverage. Subsequently, scenario 3 of FIG. 2C depicts a licensed macro cell and small cell (F1), with carrier aggregation between licensed small cell (F1) and unlicensed small cell (F3)

Figure 2D:
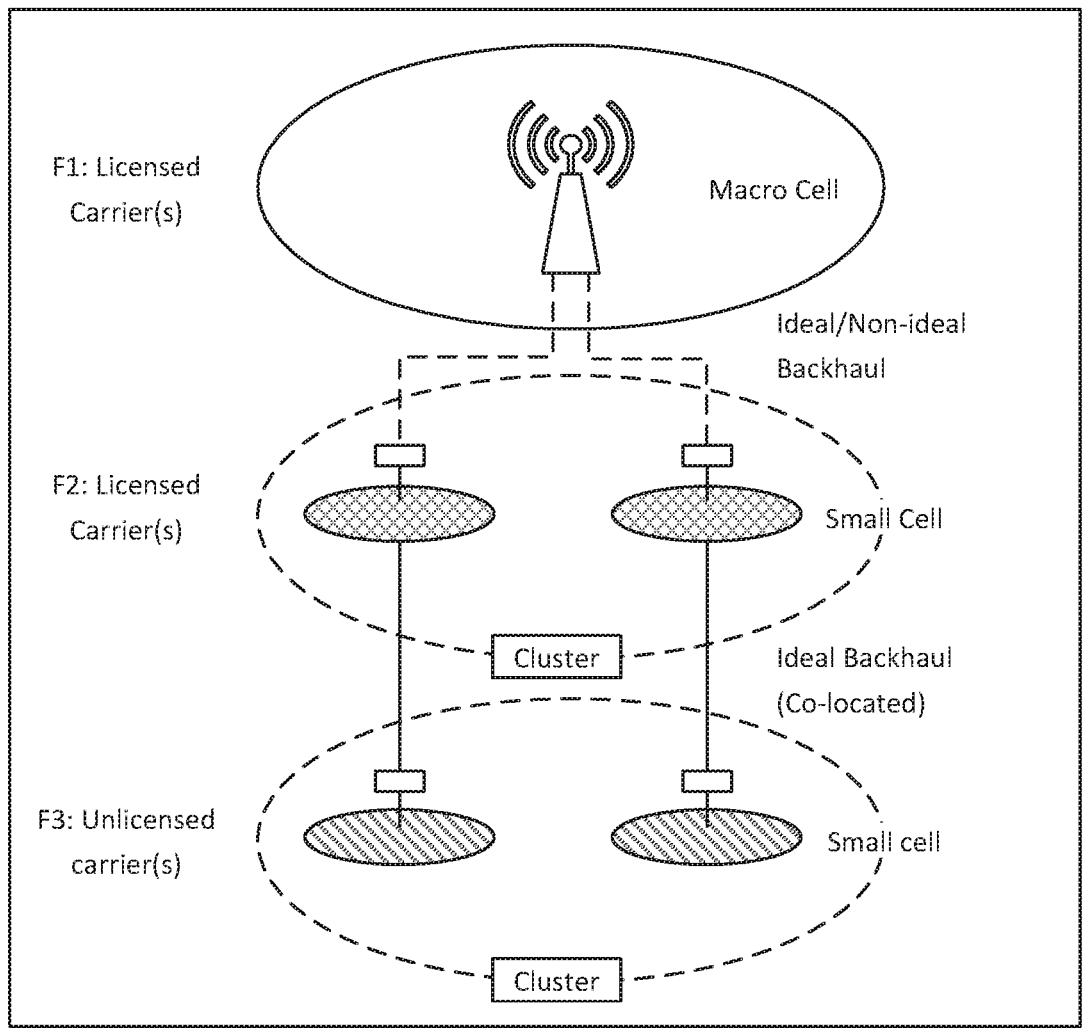

Further, scenario 4 FIG. 2D depicts a licensed macro cell (F1), licensed small cell (F2), and unlicensed small cell (F3). Scenario 4 includes carrier aggregation between licensed small cell (F2) and unlicensed small cell (F3). If there is ideal backhaul between macro cell and small cell, there can be carrier aggregation between macro cell (F1), licensed small cell (F2) and unlicensed small cell (F3). If dual connectivity is enabled, there can be dual connectivity between macro cell and small cell.

Since the unlicensed band can be utilized by different deployments specified by different standards, several regulatory requirements are imposed to insure fair coexistence between all incumbent users. For example, these regulatory requirements include constraints on transmit power mask, transmit bandwidth, interference with weather radars, etc.

In addition, another main requirement is a channel access procedure. For example, the LBT procedure is defined as a mechanism by which an equipment applies a clear channel assessment (CCA) check before using the channel. The CCA utilizes energy detection to determine the presence or absence of other signals on a channel. In turn, this determines whether a channel is occupied or clear, respectively. European and Japanese regulations mandate the usage of LBT in the unlicensed bands. Apart from regulatory requirements, carrier sensing via LBT is one way for fair sharing of the unlicensed spectrum. Hence, it is considered important for fair and friendly operation in the unlicensed spectrum in a single global solution framework.

In Release 14, several channel access procedures are introduced to be performed by eNB and UE for both downlink (DL) and UL transmissions, respectively. The main channel access procedure is described in Section 15 of TS 36.213 Release 14.

Unlicensed Spectrum in NR

In mmWave, there is a wide range of unlicensed spectrum that can be further utilized to attain higher data rates than attained by operating in sub 6 GHz frequency band. Consequently, RAN #76 introduced a new SI for NR based access to unlicensed spectrum. The main goals of the current SI include studying the different physical channels and procedures in NR-U, and how they have to be modified. The goals also include introducing new physical channels or procedures to cope with NR-U challenges. This accounts for operating in mmWave deploying narrow beams for transmission and reception above 6 GHZ up to 52.6 GHz or even above 52.6 GHz bands. Procedures to enhance the coexistence between NR-U and other technologies operating in the unlicensed, e.g., Wi-Fi devices, LTE-based LAA devices, other NR-U devices, etc., and meet the regulatory requirements are currently under study.

Synchronization Information and Discovery Reference Signal with High Priority

According to an aspect of the application in NR, SSB allows the UE to obtain pertinent information of synchronization, frame boundary etc. In NR-U, UEs in different services (e.g., NR, WIFI) share the same unlicensed spectrum. Accordingly, the UE and gNB perform LBT to make sure the channel is not occupied before transmission. This feature introduces uncertainty to the periodic or semi-persistent scheduled transmissions such as SSB transmission. Considering the essentials of SSB in cell search, synchronization etc., it is envisaged that the SSB transmission may be categorized with high priority in channel access priority class with no backoff time or have a smallest backoff time among all the channel accessing backoff times.

Figure 3A:
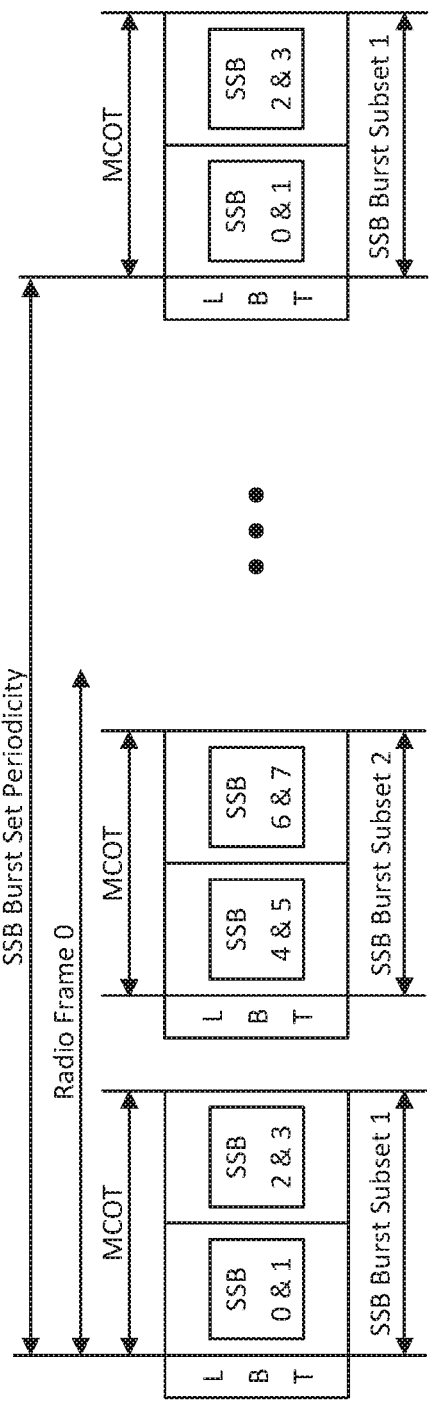
FIGS. 3A-B illustrate SSBs transmitted by SSB burst subsets in NR-U.
Figure 3B:
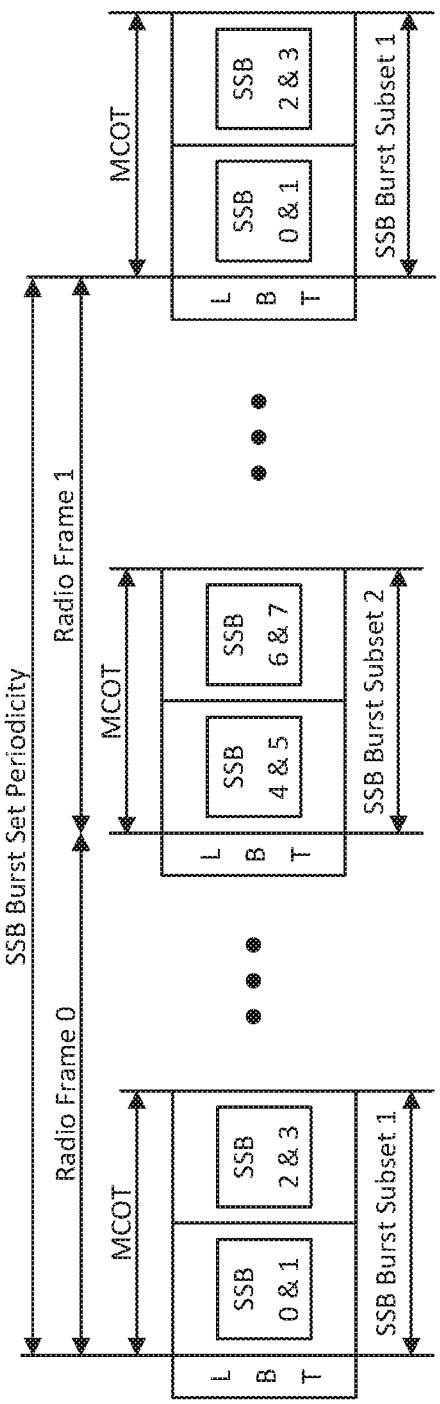

In an embodiment, the SSB will have a higher possibility to be transmitted with the tradeoff that having a smaller maximum channel occupation time (MCOT) $T_{mcot}$, e.g., $T_{mcot}$=2 ms for channel access priority class 1 in LAA. In NR, the SSBs are transmitted in the SSB burst set which may last up to 5 ms. The whole SSB burst set transmission may not be able to fit into the $T_{mcot}$ with priority class 1, e.g., subcarrier spacing case A and case D. Therefore, it is envisaged in NR-U that the SSB burst set may be divided and transmitted in several subsets to fulfill the $T_{mcot}$ requirement. An example is shown in FIGS. 3A-B using subcarrier spacing case A in NR. The subcarrier spacing is 15 Khz and carrier frequency 3 GHz≤f≤6 GHz. In this case, the whole SSB burst set contains 8 SSBs which can't fill into the $T_{mcot}$. The gNB may divide the SSB burst set into two SSB burst subsets and each SSB burst subset's duration is less than 2 ms. The gNB performs LBT and transmits a first subset and repeats the procedure for the second subset.

Alternatively, the gNB may divide the SSB burst set into finer granularity such as 4 subsets where each subset contains 2 SSBs. It is envisaged that each subset may contain one or multiple SSB bursts. The periodicity of the SSB burst subset may be the same as the periodicity of the SSB burst set. Once the SSB burst subsets are determined, it may be transmitted in one of the following exemplary ways:

In a first way, a UE may be configured by the gNB to receive multiple SSB burst subsets in one radio frame. An example of this way is exemplarily shown in FIG. 3A. In this case, a UE may be configured with one occasion to monitor all the SSB burst subsets In a second way, a UE may be configured by the gNB to receive the SSB burst subsets in different radio frames. An example of this way is exemplarily shown in FIG. 3B. In this case, a UE may be configured with different occasions to monitor different the SSB burst subsets For the case where the whole SSB burst set can be filled into the $T_{mcot}$ such as the subcarrier spacing case B, C and E, the SSB burst set may also be divided into multiple SSB burst subsets and transmitted, e.g., the gNB may transmit the SSB burst subset after the LBT with a channel occupation duration shorter than the $T_{mcot}$.

STTC

Figure 4:
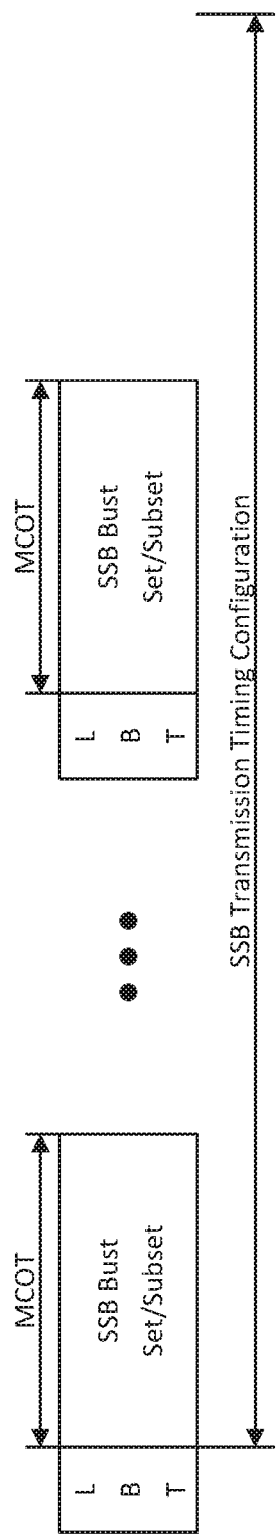
FIG. 4 illustrates a STTC according to an aspect of the application.

According to yet another embodiment, to further enhance reliability of the SSB transmission, it is envisaged the SSB burst set/subset may be transmitted in the STTC (SSB Transmission Timing Configuration). An example depiction is provided in FIG. 4. The time duration of the STTC may be pre-configured or specified. Alternatively, it may be configured/signaled by the gNB through RRC signaling, and/or MAC CE. For example, a UE may be configured with RRC message SSB_Tansmission_Timing_duration to indicate the duration of the STTC which may be 5 ms, 8 ms or etc. Within one STTC, multiple LBTs may be performed. The SSB burst set/subset may be transmitted after successful LBT and one or more SSB burst set/subset may be transmitted within one STTC. In an alternative embodiment, instead of only monitoring the SSB in one fixed location in time, a UE may monitor the SSB multiple times within the configured STTC to detect the transmitted SSB.

SSB Burst Set/Subset Transmission Slided Within the STTC

According to even another aspect of the application in NR, multiple SSBs are bundled in the SS burst set. The SS burst set is transmitted at the pre-defined/configured location. In NR-U, the gNB performs LBT before the SSB Burst transmission. The SSB transmission may still be bundled together. An example of success LBT for bundled SSB transmission at the pre-defined/configured location is shown in FIG. 5.

Figure 5:
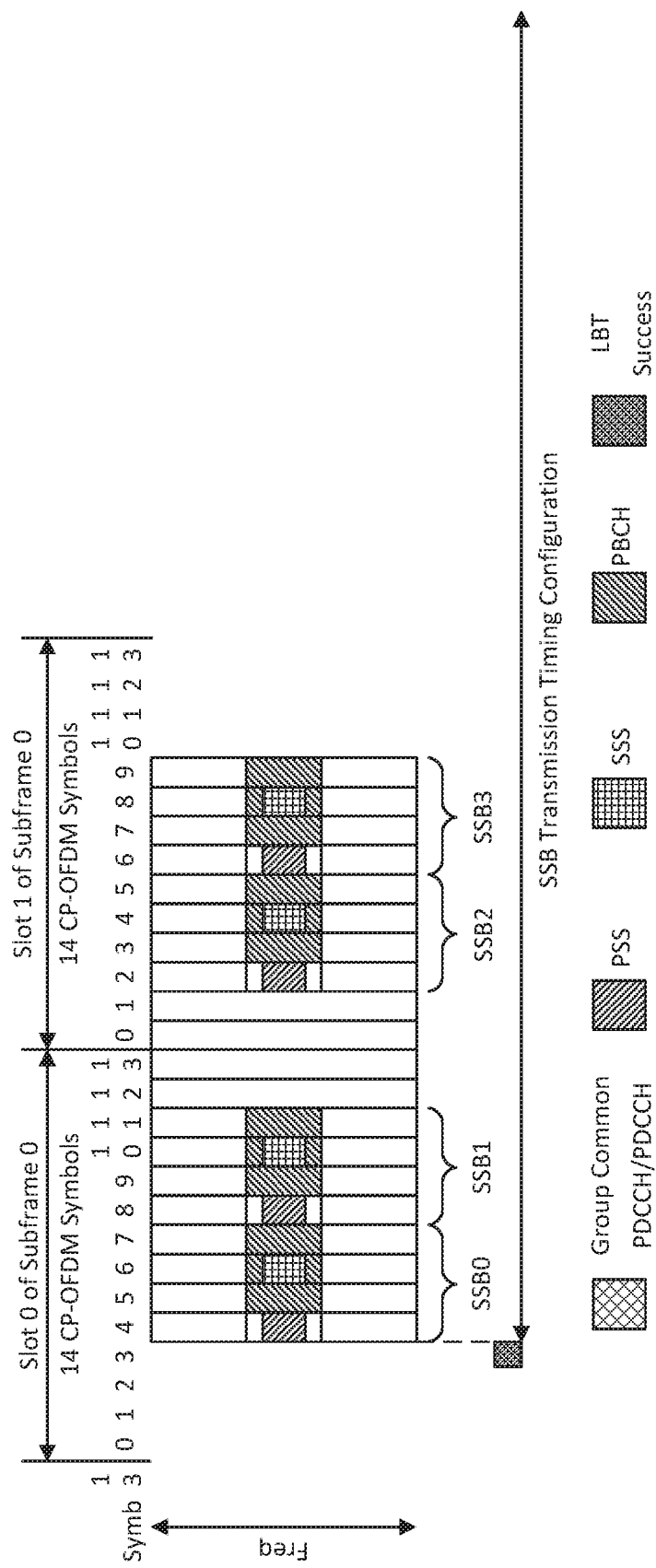
FIG. 5 illustrates a bundled SSB transmission at the pre-defined/configured location according to an aspect of the application.

According to this example in FIG. 5, omni-direction LBT or beam-based directional LBT may be performed before the configured SSB transmission. With the successful LBT on the omni-direction or all the directional beams, the SSB can be transmitted on the pre-defined/configured location as an SSB burst set. No additional LBT is need during this SSB burst set transmission if the gNB is able to occupy the channel in this duration. It is envisaged that bundled SSB transmissions may be shifted in the STTC. In this case, the SSB index order is not changed within the bundled SSB transmission (e.g., SSB #0, SSB #1, SSB #2, SSB #3), but SSB #0 location can be changed within the radio frame. Multiple LBT may be performed by the gNB within the STTC. The LBT may be performed by one of the following exemplary options:

Option 1: The gNB may perform LBT right before the possible SSB transmission location with one attempt. The possible SSB transmission location may be determined based on the resolution of the offset. This may be pre-defined in the spec or may be configured in the STTC. The possible location for SSBi=SSBi location specified +j*slot, where j is the iterations of LBT process after the initial LBT failure for SSBi. This assumes the SSB 0 is configured to be transmitted at symbol 4 of slot 1. If the offset is a number of slots, the first possible SSB transmission location for SSB 0 is at symbol 4 of slot 1, and the second possible SSB transmission location for SSB 0 is at symbol 4 of slot 2 etc. If the LBT succeeds, the gNB will transmit the shifted SSB. If the LBT fails, the gNB may perform LBT before the next possible SSB transmission location. This option is exemplarily depicted in FIG. 6. The gNB may perform 25 µs LBT with no backoff time at symbol 3 in slot 0. The LBT can be either omni-direction LBT or beam-based directional LBT. If it fails, the gNB may perform 25 µs LBT with no backoff time at symbol 3 in slot 1. If the LBT succeeds in slot 1, the bundled SSB may be transmitted starting from the symbol 4 of slot 1 to the symbol 9 of slot 2.

Figure 7:
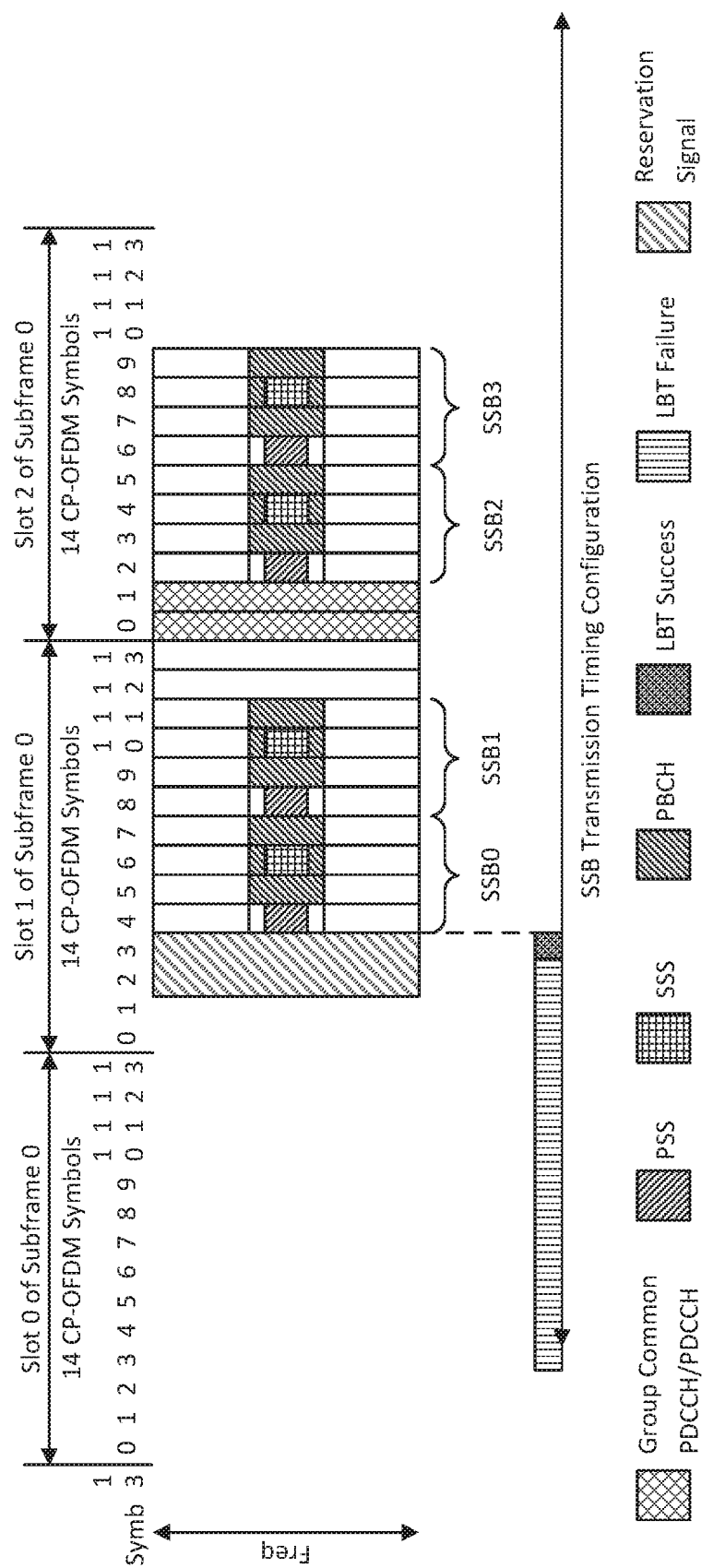
FIG. 7 illustrates a reservation signal assisted bundled SSB transmission with sliding within STTC according to an aspect of the application.

Option 2: The gNB may perform LBT before the possible SSB transmission location with multiple attempts. The possible SSB transmission location may be determined based on the resolution of the offset which may be pre-defined in the spec or may be configured in the STTC. The possible location for SSBi=SSBi location specified +j*slot, where j is the iterations of LBT process after the initial LBT failure for SSBi. If the LBT succeeds earlier than the possible SSB transmission location, reservation signal will be transmitted to occupy the channel and SSB will be transmitted on the possible SSB transmission location. An exemplary illustration is shown in FIG. 7. The gNB may perform 25 µs LBT with no backoff time at symbol 3 in slot 0. The LBT can be either omni-direction LBT or beam-based directional LBT. If it fails, the gNB may continue to perform LBT. If the LBT succeeds at symbol 0 in slot 1, reservation signal may be transmitted to hold the channel which may last a few number of symbols. Note the reservation signal cannot be arbitrarily long due to the limitation of the MCOT. Ultimately, the bundled SSB may be transmitted starting from the symbol 4 of slot 1 to the symbol 9 of slot 2.

Figure 6:
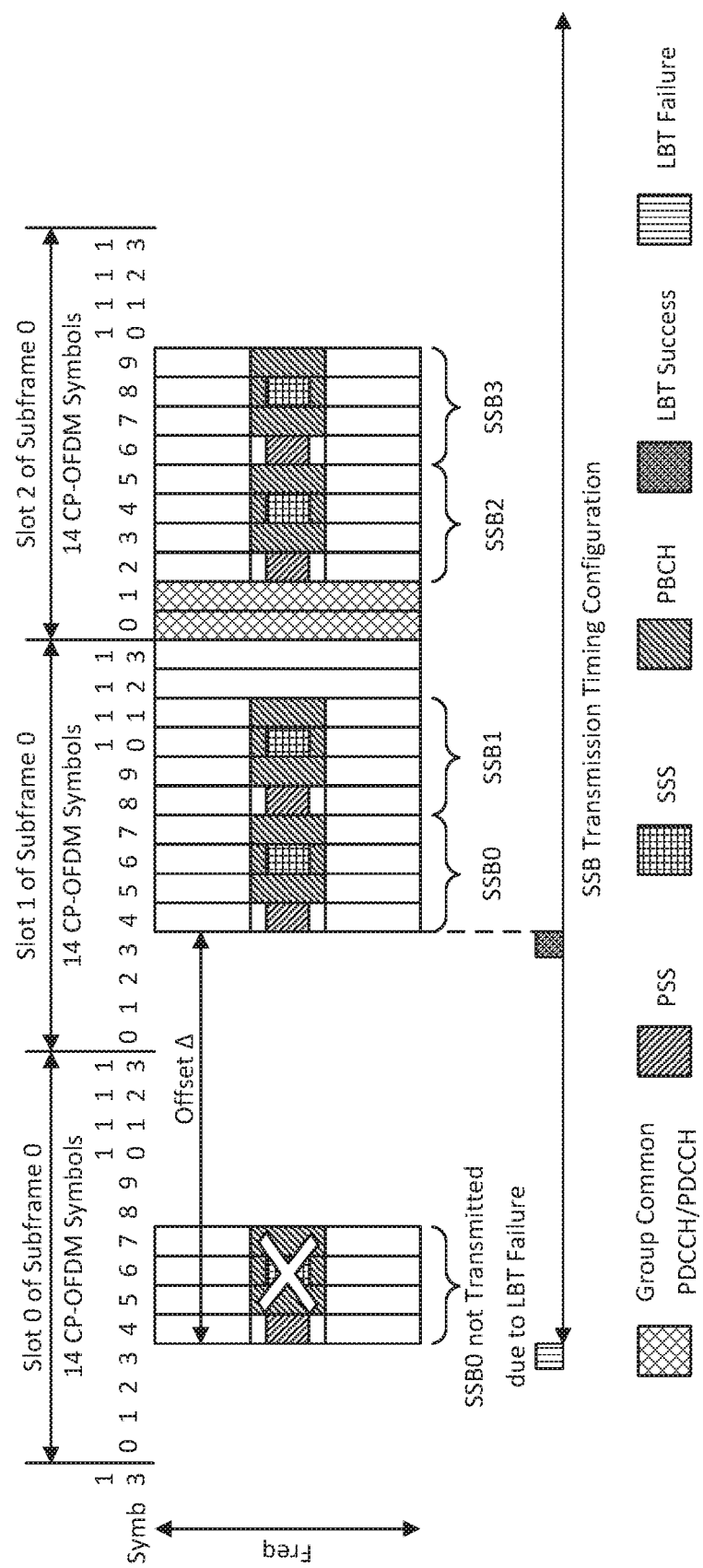
FIG. 6 illustrates a bundled SSB transmission with sliding within STTC according to an aspect of the application.

In an embodiment, the bundled SSB transmission is shifted in the STTC. In this scenario, a fixed offset Δ is introduced to all the SSBs from the radio frame boundary. For example, the offset may be in number of slots as shown in FIG. 6 and FIG. 7. In this case, Δ32 k slot(s) where k=0, 1, 2, ..., K−1.

Figure 8:
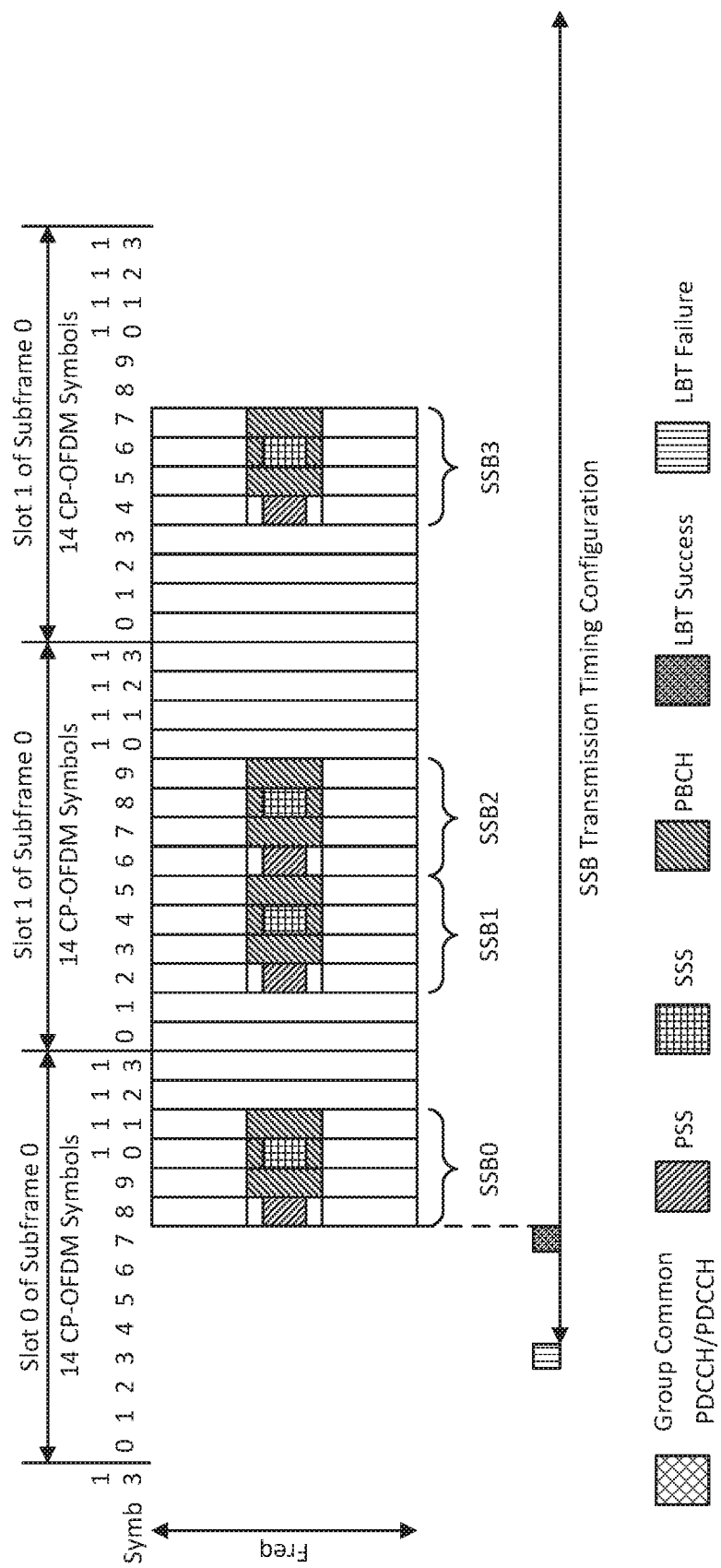
FIG. 8 illustrates bundled SSB transmission with one SSB location slide within STTC according to an aspect of the application.

In an alternative embodiment, the offset may be in number of SSB locations. The possible SSB transmission location may be determined based on the resolution of the offset and may be predefined in the spec or may be configured in the STTC. This assumes SSB 0 is configured to be transmitted at symbol 4 of slot 1. If the offset is the number of SSB locations, the first possible SSB transmission location determined by the offset resolution and iterations of LBT process after the initial LBT failure for SSB 0 is at symbol 8 of slot 0. The second possible SSB transmission location for SSB 0 is at symbol 4 of slot 1, etc. An exemplary embodiment is shown in FIG. 8. The LBT may fail at symbol 3 in slot 0 but succeed at symbol 7 in slot 0. In this scenario, the bundled SSB may be shifted by one SSB location and transmitted. In other words, the SSB 0 is transmitted on the location supposed to transmit for SSB1, the SSB 1 is transmitted on the location supposed to transmit SSB 2, etc. The offset will be the SSB index difference between the schedule SSB index and the actual transmitted SSB index.

In the example shown in FIG. 8, the offset is equal to 1. The offset is a logic value, a UE need to map the logic value to physical location based on a specific SSB configuration. In this example, LBT is performed right before the possible SSB transmission location determined by the offset resolution and iterations of LBT process after the initial LBT failure and no reservation signal is used. In an alternative embodiment, a reservation signal may be employed for this solution.

In another case, the SSB index order may be changed within the bundled SSB transmission when the SSB bundle is shifted. For example, the SSB index order may be cyclically shifted, e.g., the cyclically shifted SSB index order may be SSB #1, SSB #2, SSB #3, SSB #0.

According to an embodiment, to determine the frame boundary, a UE needs to be aware of the information of both the SSB block index and offset Δ. An example of offsetΔ is shown in FIG. 8. To achieve the information of the offset, a UE may indicate the value of offset Δ using one of the following options:

Option 1: The value of offset Δ may be indicated by the payload of PBCH. For example, PBCH of all beams may carry same payload and indicate the offset from the frame boundary (2 bits for 4 locations). For example, if there are 4 or 8 SSBs within the SSB burst set transmission, the reserved PBCH payload bits ($\bar{a}_{\bar{j}+6}$, $\bar{a}_{\bar{j}+7}$ may be used to indicate the offset Δ. A UE may determine the frame boundary with the information of SSB block index and offset Δ. Alternatively, some additional field may be added to the PBCH to convey the value of offset Δ.

Option 1a: The offset Δ may be indicated by applying a mask to the CRC bits of the PBCH payload. The UE decodes the PBCH and applies different masks to the CRC. The mask that makes the CRC checksum successful is used to indicate the offset Δ.

Option 2: The value of offset Δ may be indicated through PBCH DMRS. The PBCH DMRS may be initialized by the offset Δ. An example is provided below as follows:

$$c_{init}=2^{11}(i_{SSB}+8\Delta+1)(\lfloor N_{ID}^{cell}/4 \rfloor+1)+2^{6}(i_{SSb}+8\Delta+1)+$$
$$(N_{ID}^{cell} \bmod 4)$$

When a UE detects the PBCH DMRS by blindly cross-correlation, it determines the offset value based on the PBCH DMRS sequence.

Option 3: The value of offset $\Delta$ may be jointly indicated through PBCH DMRS and payload of PBCH, e.g., assume 3 bits are needed to indicate the offset $\Delta$, the two MSB may be indicated in the payload of the PBCH. The one LSB may be indicated by the PBCH DMRS by using different sequences initialized by LSB of the offset.

Figure 9:
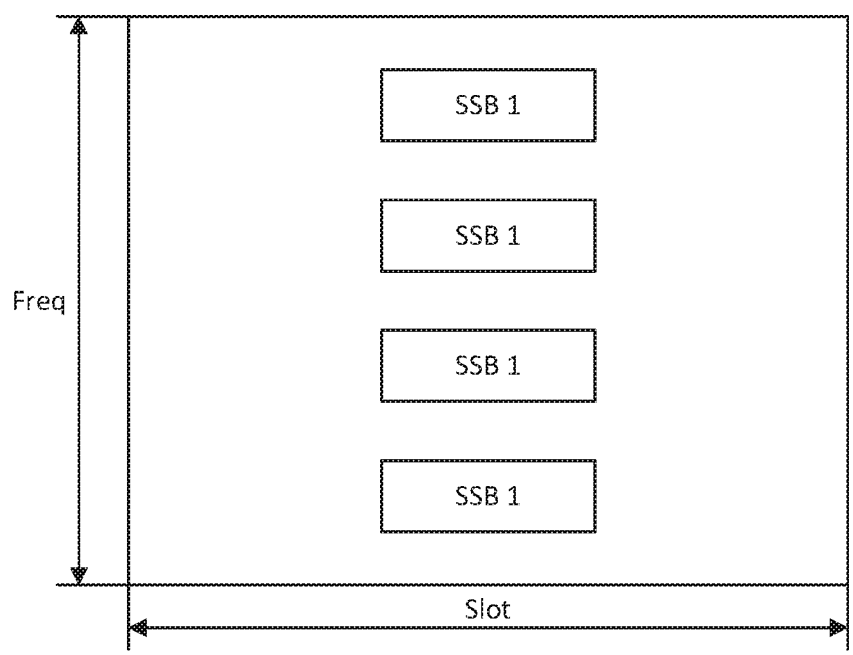
FIG. 9 illustrates SSB transmission with repetition in the frequency domain according to an aspect of the application.

Option 4: This is based upon the requirement of channel occupation in the frequency of the unlicensed band. In NR-U, the SSB may be repeated in the frequency domain and transmitted on the same beam to achieve the requirement. An exemplary embodiment is depicted in FIG. 9.

In NR, the PBCH DMRS is used to blindly detect up to 3 LSB bits of the SSB index. If the offset $\Delta$ also must be indicated, the number of blind decoding increases and the PBCH DMRS may not be sufficiently robust. It is envisaged that the SSB repetition may advantageously be employed to indicate the offset $\Delta$.

If the SSB is repeated, spreading codes may be applied to the PBCH DMRS. Different spreading code may be used for different SSBs, e.g., the PBCH DMRS of SSB 1 may be spread with [1 1 1 1], the PBCH DMRS of SSB 2 may be spread with [1 1 −1 −1], the PBCH DMRS of SSB 3 may be spread with [1 −1 1 −1] etc. The value of offset $\Delta$ may be implicitly indicated by the spreading code. For example, when $\Delta=1$, the PBCH DMRS of SSB is spread with [1 1 1 1], when $\Delta=2$, the PBCH DMRS of SSB is spread with [1 1 −1 −1], etc.

Figure 10:
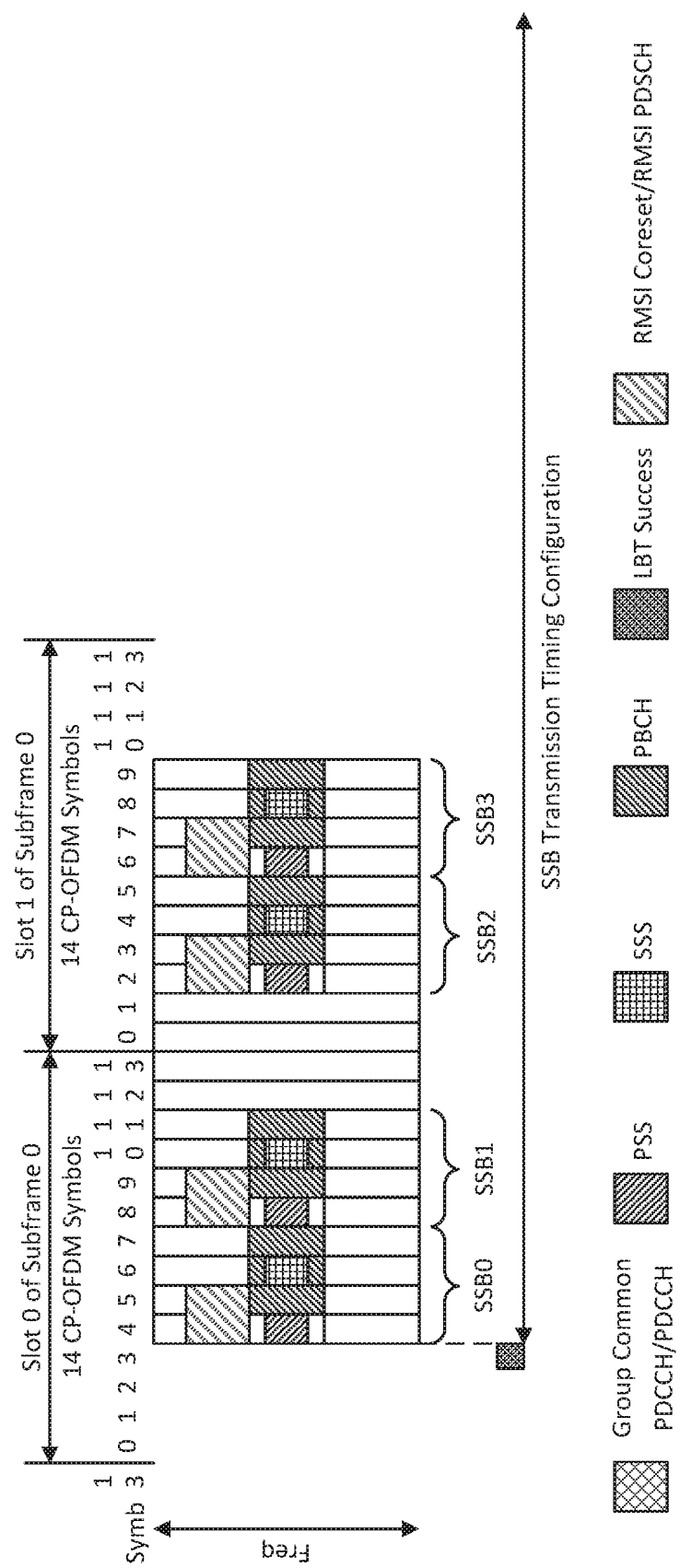
FIG. 10 illustrates RMSI CORESET FDM-ed with SSB in the same slot according to an aspect of the application.

Option 5: The value of offset $\Delta$ may be indicated by the RMSI PDCCH or RMSI PDSCH. In NR-U, the RMSI CORESET and/or RMSI PDSCH may be transmitted in the same slot associated with the transmitted SSB. For example, the RMSI CORESET and SSB may be FDM-ed in the same slot as shown in FIG. 10. A new field may be added to the RMSI PDCCH to carry the SSB offset value $\Delta$. When a UE detects the SSB, it may decode the RMSI PDCCH that transmitted in the same slot to determine the offset that the SSB may be shifted. Therefore, the UE can determine out the frame boundary. A UE may determine the location of the RMSI PDCCH by some rules pre-defined in the spec or by the RMSI-PDCCH-Config message configured in MIB. The UE may determine PDCCH monitoring occasions from the k least significant bits of RMSI-PDCCH-Config. If both M and O provided by the k least significant bits of RMSI-PDCCH-Config are equal to 0, the RMSI CORESET may be FDM-ed with SSB in the same slot.

Figure 11:
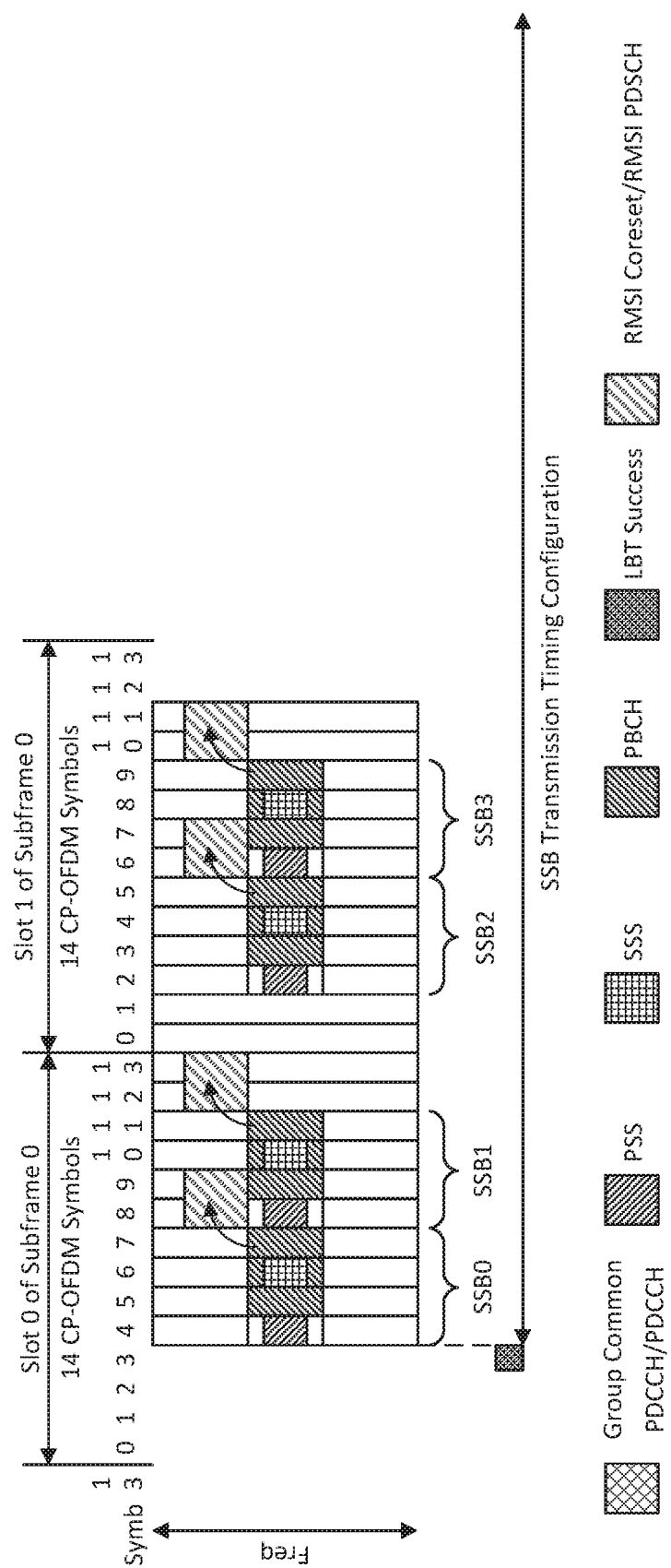
FIG. 11 illustrates RMSI CORESET TDM-ed and FDM-ed with SSB in the same slot according to an aspect of the application.

In an alternative embodiment, the RSMI CORESET may be TDM-ed with the SSB in the same slot as shown in FIG. 11. For example, the SSB 0 is transmitted from symbol 4 to symbol 7. The corresponding RMSI CORESET and/or PDSCH may be transmitted from symbol 8 to symbol 9. In the frequency domain, The RBs used to transmit the RMSI CORESET/PDSCH and the SSB may be different as shown in the figure; TDM-ed and FDM-ed. In an alternative embodiment, the same RBs may be used to transmit the RMSI CORESET/PDSCH and the SSB.

In yet another embodiment, gNB may perform LBT one beam a time. For example, starting from SSB 0, gNB first performs LBT for SSB 0. If SSB 0 is transmitted, gNB transmits SSB 0 and performs LBT for next SSB, e.g., SSB 1. If SSB 0 cannot be transmitted, the remaining SSB burst (SSB 0, SSB 1, SSB 2, SSB 3) is shifted and gNB performs LBT for SSB 0 in next time occasion. If SSB 0 is transmitted in time occasion k but SSB 1 cannot be transmitted in time occasion k+1. The remaining SSB burst (SSB 1, SSB 2, SSB 3) is shifted and gNB performs LBT for SSB 1 in the next time occasion (time occasion k+2). This procedure is repeated until all the SSBs in the burst are transmitted or until the STTC window is expired.

For initial cell selection for a UE in idle state or inactive state, it is envisaged to assume some fixed STTC, e.g., the UE may assume the duration of the STTC is 5 ms, as pre-defined in the spec. The UE may determine the frame boundary based on the pre-defined STTC, detected SSB transmission offset A, etc.

Figure 12:
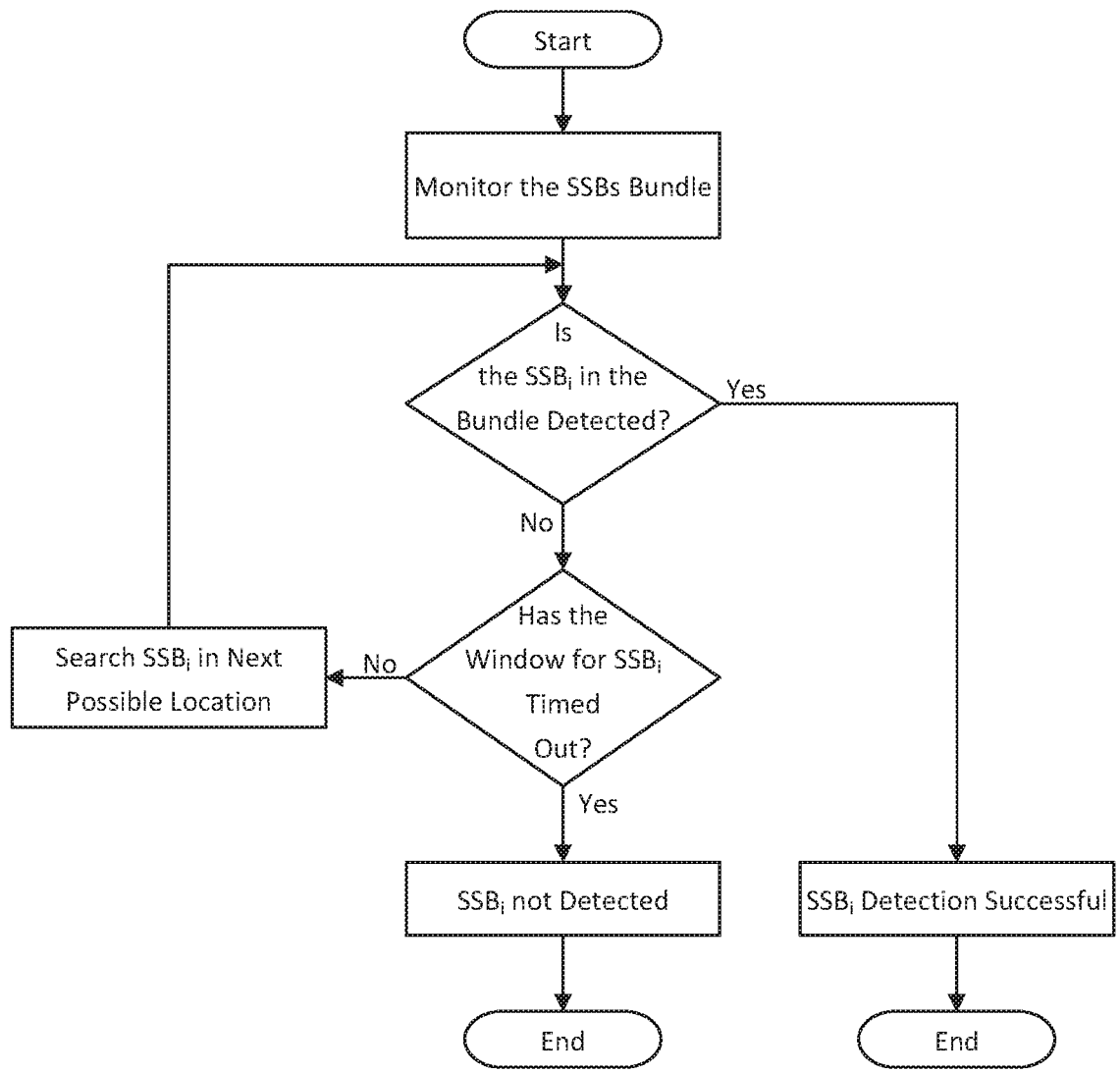
FIG. 12 illustrates a procedure for monitoring and receiving bundled SSB transmissions in NR-U according to an aspect of the application.

For a UE in connected state, the UE may be configured with the STTC by one or more of the RRC signaling, MAC CE. The UE may determine the frame boundary based on the SSB index, detected SSB transmission offset $\Delta$ etc. An example of the procedure for monitoring and receiving the bundled SSB transmission is shown in FIG. 12.

SSB Burst Set/Subset Transmission with Opportunistic Transmission

Figure 13:
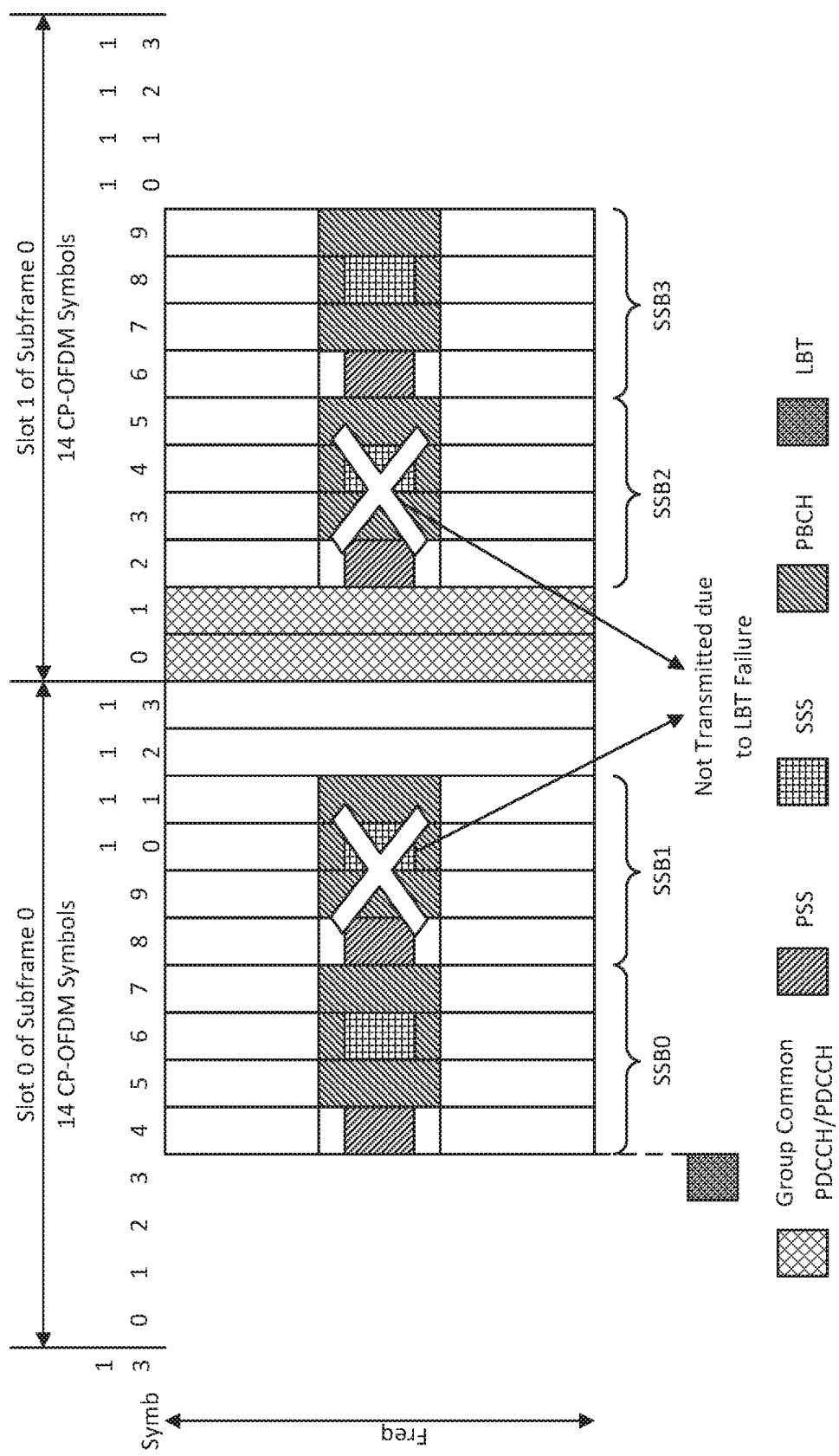
FIG. 13 illustrates unbundled SSB transmission according to an aspect of the application.

According to another aspect of the application in NR-U, it is envisaged that SSB transmission may not be bundled, e.g., the gNB may perform beam-based directional LBT for all the beams before the schedule SSB transmission. For the beams with successful LBT, the corresponding SSBs will be transmitted. For the beams with LBT failure, the gNB may skip the transmission of corresponding SSBs. This is exemplarily shown in FIG. 13. The gNB performs beam-based directional LBT. It may perform LBT for all 4 beams before slot 0 of subframe 0. Alternatively, it may perform LBT for beam 0 and beam 1 before slot 0 of subframe 0. It may perform LBT for beam 2 and beam 3 before slot 1 of subframe 0. Only LBT for beam 0 and beam 3 are succeeded. Therefore, only SSB #0 and SSB #3 are transmitted at the scheduled location. Meanwhile, SSB #1 and SSB #2 are dropped.

Figure 14:
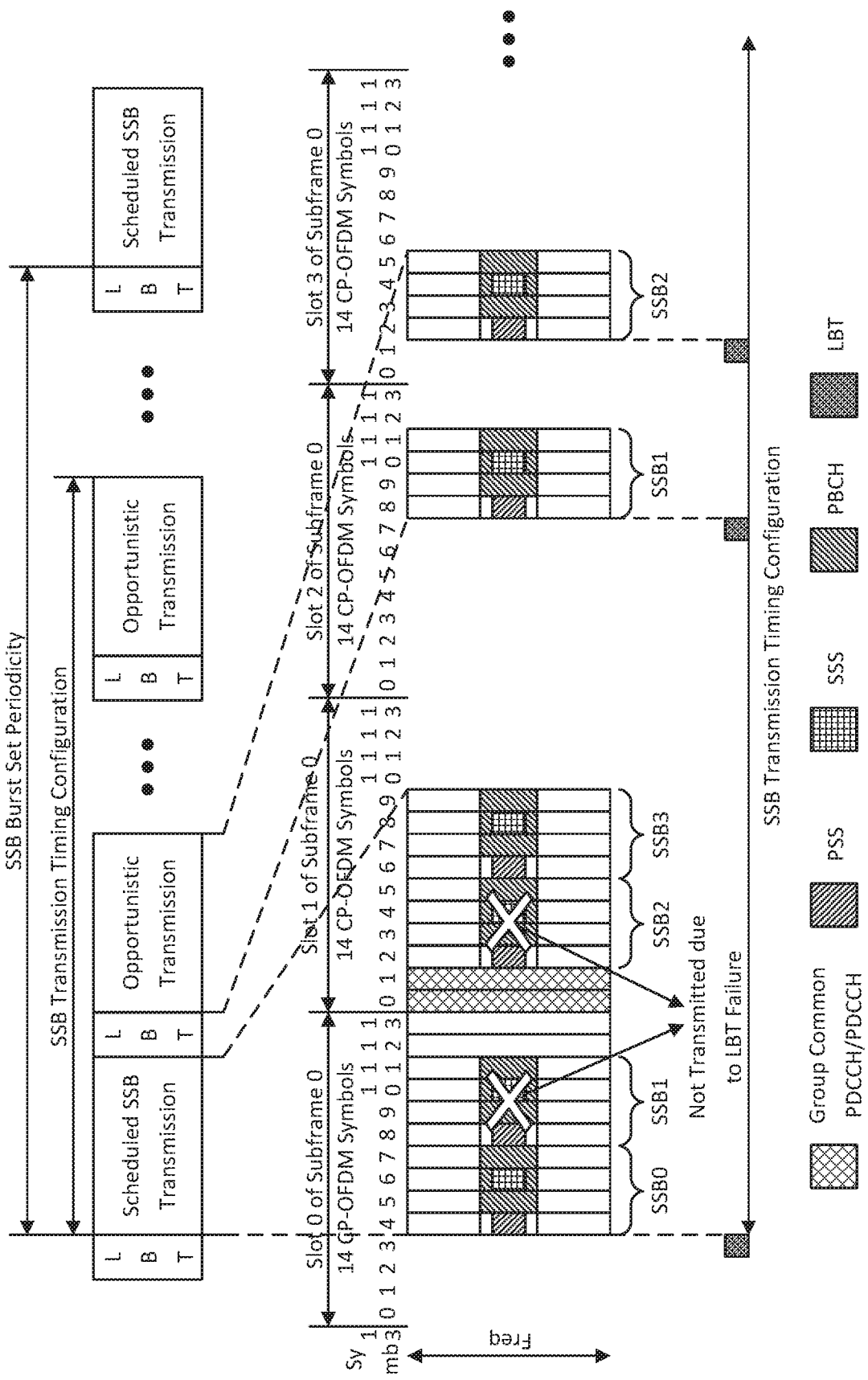
FIG. 14 illustrates unbundled SSB transmission with opportunistic transmission within STTC according to an aspect of the application.

Dropping SSB transmission may be critical given its essentiality in NR systems. To improve reliability of SSB transmission, in addition to scheduled SSB transmission, a UE may be configured with opportunistic SSB transmission to monitor the dropped SSB transmission due to LBT failure, e.g., SSB #1 and SSB #2 are dropped due to beam-based LBT failure in the scheduled SSB transmission. Then, the gNB may perform beam-based directional LBT for the dropped SSBs before configured opportunistic SSB transmission. The corresponding SSBs will be transmitted during the configured opportunistic SSB transmission if the beam-based LBT is succeeded. The LBT can either be LBT with no backoff time, or LBT with a contention window such as channel access priority class 1. The resources may not be used for other transmissions regardless of the SSB being transmitted in opportunistic SSB transmission. In so doing, the opportunistic resource may be empty if the SSB is not sent. A UE may always assume data is rate matched around the opportunistic resource. Within one opportunistic SSB transmission, multiple SSBs may be transmitted after corresponding LBT successes. Alternatively, opportunistic SSB transmission may be beam specific, e.g., each SSB is configured with dedicated opportunistic SSB transmission configuration. The opportunistic SSB transmission may be configured with one of the following options:

Option 1: A UE may be configured to monitor the opportunistic SSB transmission within the STTC after the scheduled SSB transmission. An example embodiment is shown in FIG. 14. In this example, opportunistic SSB transmission is beam specific and SSB 1 and SSB 2 both fail in scheduled transmission. Successful LBT for SSB 1 is performed at symbol 7 in slot 2. SSB1 is transmitted from symbol 8 to symbol 11 in configured slot 2. A successful LBT for SSB 2 is performed at symbol 1 in slot 3. Then the SSB1 is transmitted from symbol 2 to symbol 5 in slot 5

In this case, SSB specific offset $\Delta_{SSB,i}$ may be introduced to each SSB from the frame boundary. A UE may determine the frame boundary by the information of both SSB specific offset $\Delta_{SSB,i}$ indicated and the SSB index.

Figure 15:
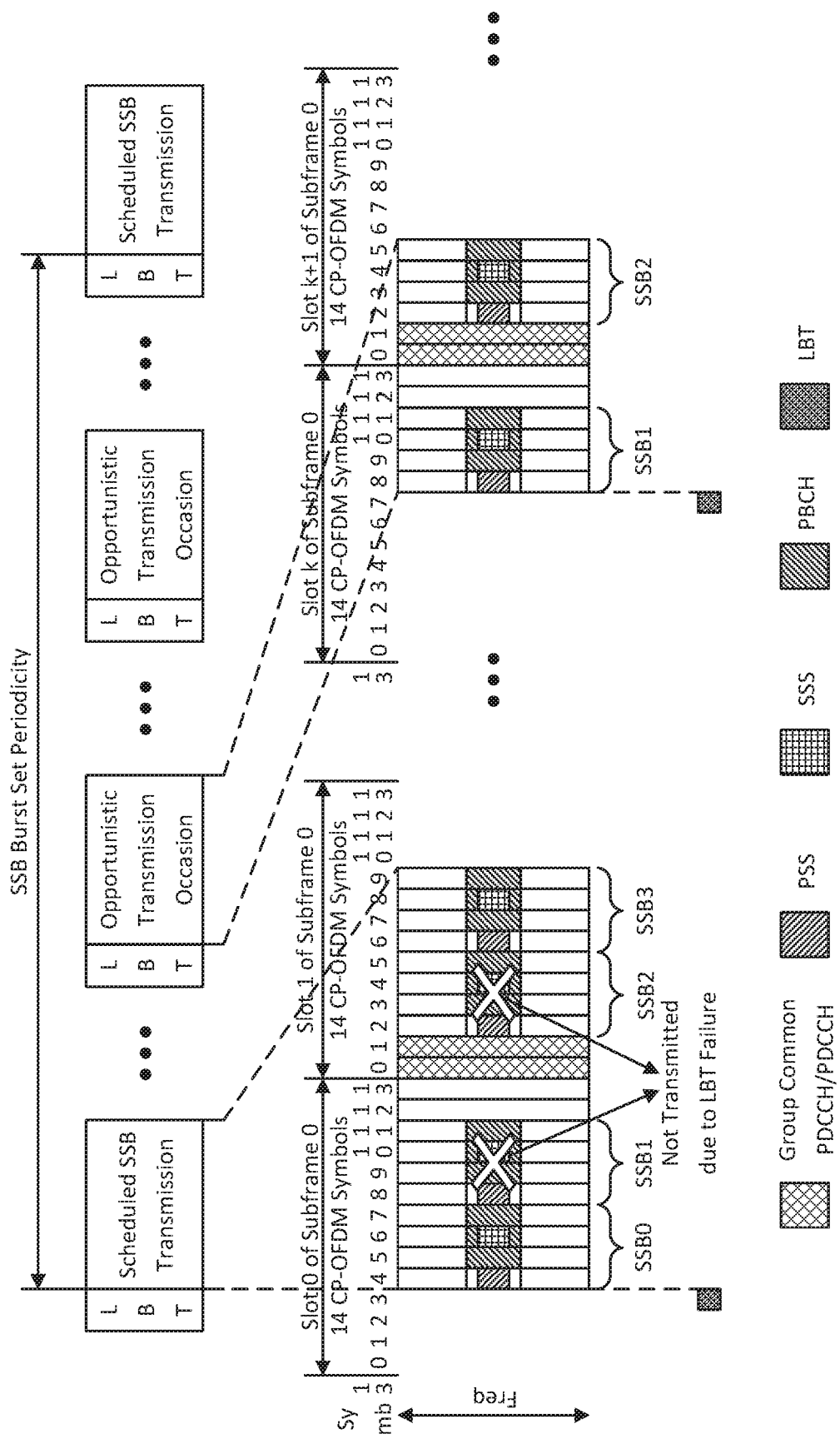
FIG. 15 illustrates unbundled SSB transmission with configured opportunistic transmission according to an aspect of the application.

Option 2: A UE may be not configured with STTC. A UE may be configured to monitor opportunistic SSB transmission occasions between two scheduled SSB transmissions. An exemplary embodiment is shown in FIG. 15. SSB 1 and SSB 2 both fail in the scheduled transmission. A LBT for SSB 1 and SSB 2 is performed at symbol 7 in slot k. Within opportunistic SSB transmission occasion, one shot LBT and a transmission attempt may be performed. Alternatively, STTC may be configured where multiple LBT and transmission attempts may be performed. If STTC is configured, the SSB offset $\Delta_{SSB,i}$ or $\Delta$ may be employed by the UE to determine the frame boundary.

Figure 16:
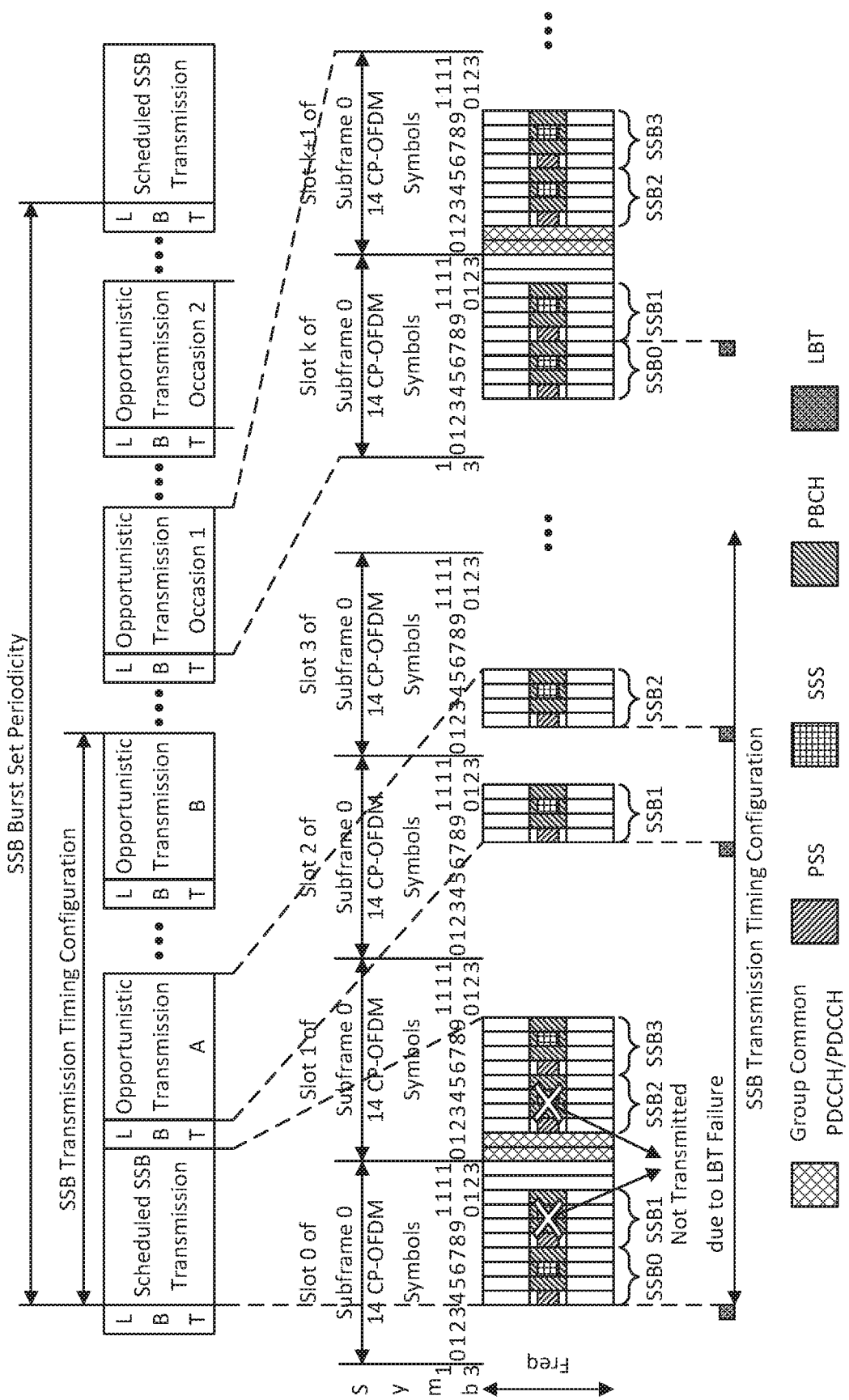
FIG. 16 illustrates unbundled SSB transmission with STTC and configured opportunistic transmission according to an aspect of the application.

Option 3: A UE may be configured with STTC. The UE may be also configured with opportunistic SSB transmission occasions both two STTCs. An exemplary embodiment is shown in FIG. 16. Within the STTC, if any SSB is not transmitted at the schedule location due to LBT failure, it may be shifted (e.g., transmit in opportunistic transmission or opportunistic transmission b etc.). Between two STTCs, a UE may be configured with SSB transmission occasions, i.e., transmit in opportunistic transmission occasion 1, opportunistic transmission occasion 2, etc. The gNB may perform cat 1 or cat 4 LBT before each opportunistic transmission occasion. If the channel is clear, the gNB will transmit the SSB within the opportunistic transmission occasion. If the channel is not clear, the gNB will skip the opportunistic transmission occasion. For each opportunistic transmission occasion, the same SSB may be transmitted, e.g., gNB may do LBT and try to transmit all the 4 SSBs (SSB0, SSB 1, SSB 2, SSB3) in both opportunistic transmission occasion 1 and opportunistic transmission occasion 2. In an alternative embodiment, different SSBs may be transmitted in different opportunistic transmission occasions, e.g., gNB may do LBT and try to transmit SSB 0 and SSB 1 in opportunistic transmission occasion 1. The gNB may do LBT and attempt transmission of SSB 2 and SSB 3 in opportunistic transmission occasion 2.

According to another embodiment, for initial cell selection, a UE in idle state or inactive state may assume some fixed STTC, e.g., duration, as pre-defined in the spec. The UE may determine the frame boundary based on the pre-defined STTC, detected SSB transmission offset $\Delta$ or $\Delta_{SSB,i}$ etc.

Figure 17:
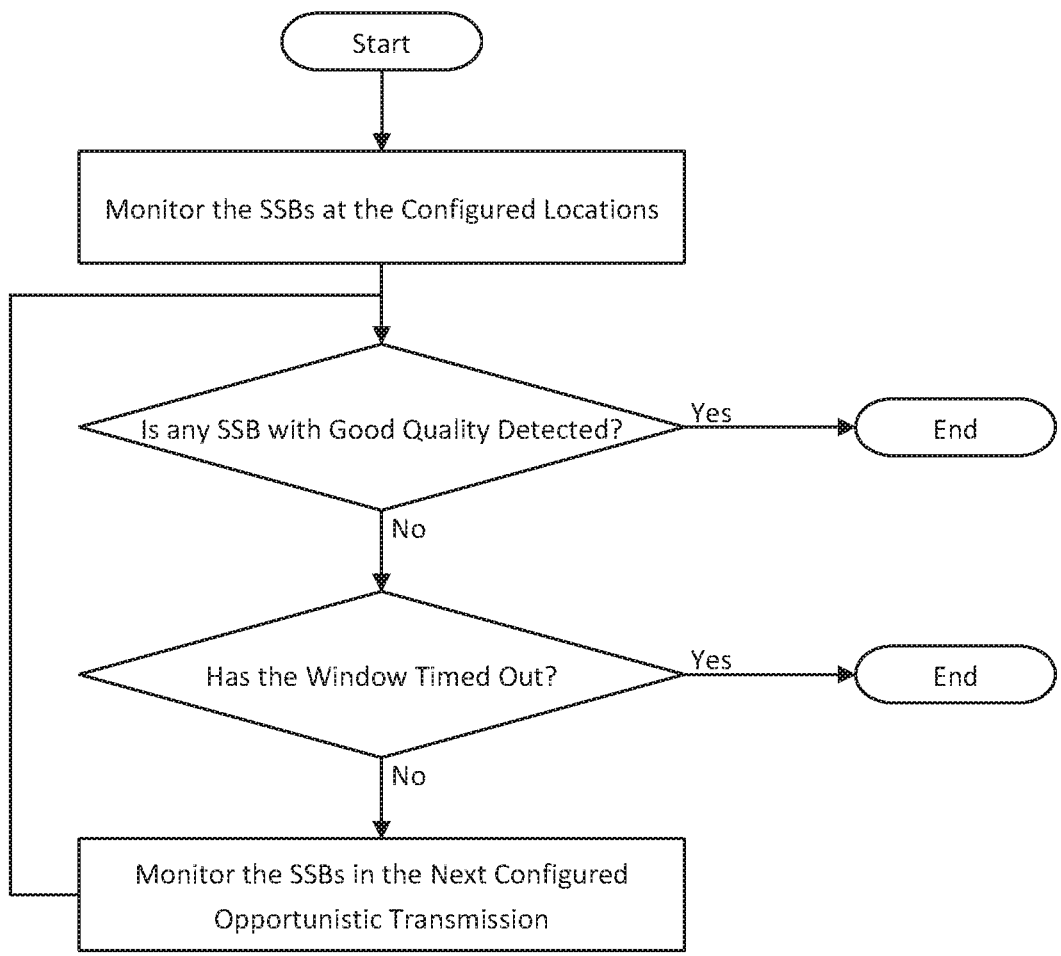
FIG. 17 illustrates a procedure for monitoring and receiving SSB transmission with opportunistic transmission in NR-U according to an aspect of the application.

For a UE in connected state, the UE may be configured with the STTC by one or more of the RRC signaling and MAC CE. The UE may determine the frame boundary based on the pre-defined/configured STTC, detected SSB transmission offset $\Delta$ or $\Delta_{SSB,i}$ etc. An example of the procedure for monitoring and receiving the SSB transmission with opportunistic transmission is shown in FIG. 17.

SSB Transmission with Dedicated STTC

Figure 18:
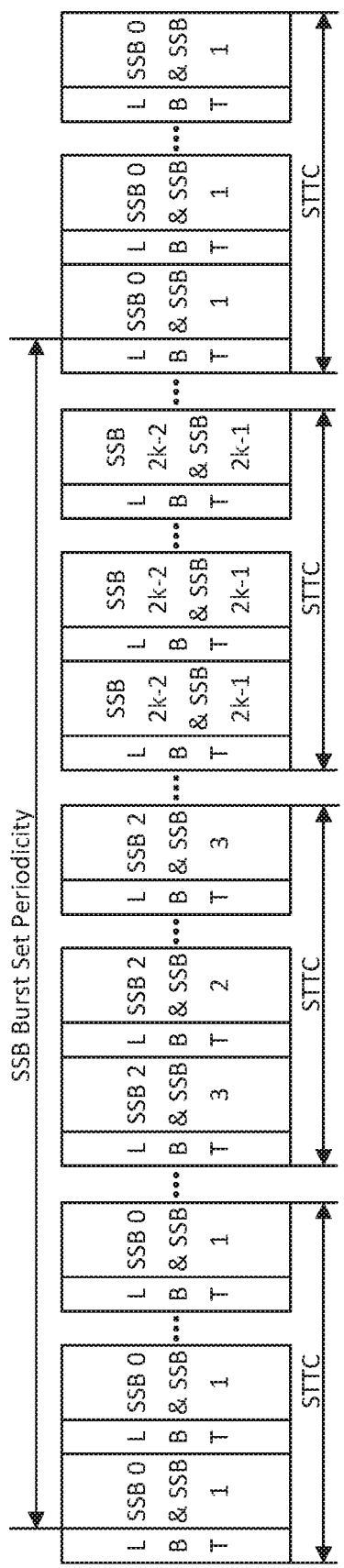
FIG. 18 illustrates SSB transmission with dedicated STTC according to an aspect of the application.

According to yet another aspect of the application, it is envisaged that a UE may be configured to monitor dedicated STTC for each SSB or each two SSBs. An example is shown in FIG. 18.

Within one SSB burst set transmission period (e.g., 20 ms), the STTC may be configured for each two SSBs transmitted in one slot (instead of the whole burst or half burst). Assume 15 KHz numerology and 4 ms, SSB 0 and SSB 1 may be transmitted in any slot of the 4 slots. Then SSB 2 and SSB 3 may slide across the 4 slots within its STTC. The STTCs may be contiguous, e.g., staring from 0 ms, 4 ms, 8 ms etc. Alternatively, the STTCs may be non-contiguous, e.g., staring from 0 ms, 5 ms, 1 0 ms etc. Within each STTC, the offset $\Delta$ of the SSB transmission need to be indicated to the UE for determining the frame boundary.

For initial cell selection, a UE in idle state or inactive state, it may assume some fixed STTC, e.g., duration and time location, as pre-defined in the spec. The UE may determine the frame boundary based on the pre-defined STTC, SSB transmission offset $\Delta$ etc.

For a UE in a connected state, the UE may be configured with the STTC by one or more of the RRC signaling and MAC CE. The UE may determine the frame boundary based on the configured STTC, SSB transmission offset $\Delta$ etc.

Figure 19:
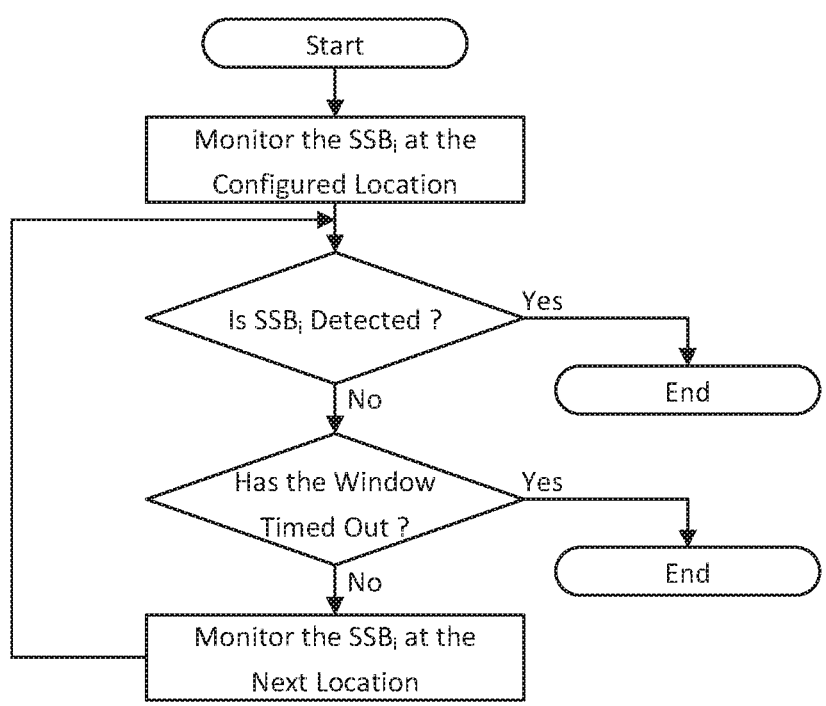
FIG. 19 illustrates procedures for monitoring and receiving the dedicated SSB transmission with STTC according to an aspect of the application.

An exemplary procedure for monitoring and receiving the dedicated SSB transmission with STTC is provided in FIG. 19. The UE may repeat the procedure for different SSBs in different configured STTC.

SSB Burst Set/Subset Transmission with Flexible Index Order

In yet a further aspect of the application, in NR, the SSB is transmitted on the fixed SSB location, e.g., the SSB #0 is transmitted on SSB location 0, SSB #1 is transmitted on SSB location 1. Therefore, within the SSB transmission, the order of the SSB index is fixed, e.g., SSB #0, SSB #1, SSB #2, SSB #3.

Figure 20:
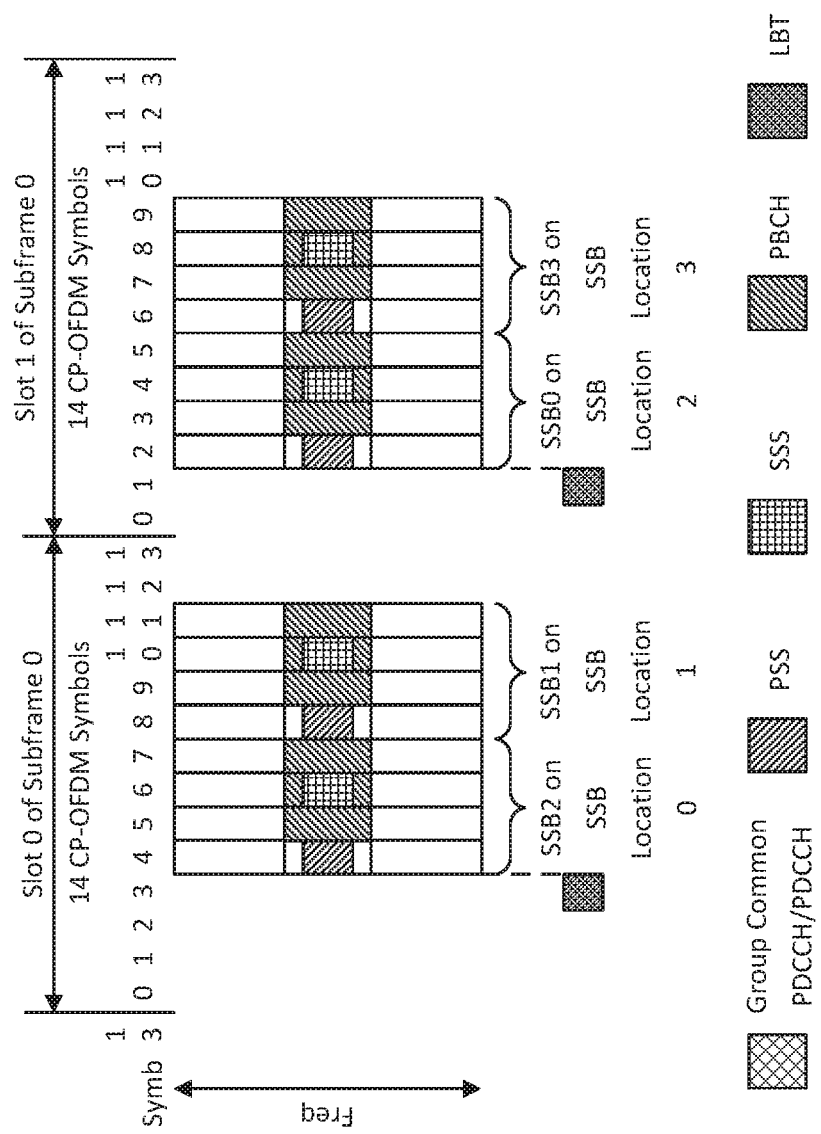
FIG. 20 illustrates SSB transmission with flexible index order according to an aspect of the application.

In NR-U, it is envisaged that a UE may be configured to monitor the SSB transmission with flexible order index. E.g., SSB index order can be different within the burst. The same SSB may be transmitted on different SSB locations within the SSB burst set/subset transmission. An exemplary embodiment is shown in FIG. 20.

The gNB may perform beam-based directional LBT for all the beams before slot 0 of subframe 0. If the channel for the scheduled SSB is available, the gNB may transmit the scheduled SSB on the scheduled location, e.g., the channel is available for SSB1, then the SSB 1 is transmitted on the SSB location 1. If the channel for the scheduled SSB is not available while the channel for the other SSB is available, the gNB may transmit the available SSB on the that location, e.g., the channel for SSB 0 is not available while the channel for SSB2 is available, then the SSB 2 may be transmitted on the SSB location 0. For the SSBs that have already been transmitted, the gNB will not perform beam-based LBT for that beam in the rest LBT occasion within one SSB burst set/subset transmission. When multiple un-transmitted SSB channels are available for one SSB location, the SSB that has missed its schedule SSB location may have higher transmission priority. For example, SSB 2 cannot be transmitted on SSB location 2 due to LBT failure. While the channels for SSB 0 and SSB 4 are available. SSB 0 may be transmitted on SSB location 2. If some of the SSBs are not able to be transmitted within the MCOT, gNB may drop those beams. Alternatively, STTC may be configured and opportunistic transmission may be performed for the failed SSBs.

To determine where the SSB is actually transmitted, a UE may provide with the offset value $\Delta_{SSB,i}$ for each SSB. The offset value may be negative. If so, one more bit may be needed to represent whether the value is positive or negative.

In an alternative embodiment, the SSB location index information may be carried by the PBCH DMRS and PBCH payload. For example, if there are 64 SSBs within the SSB burst set transmission, the PBCH payload bits $\bar{a}_{\bar{A}+5}$, $\bar{a}_{\bar{A}+6}$, $\bar{a}_{\bar{A}+7}$ may be the 6th, 5th, and 4th bits of SSB location index. The PBCH DMRS may be initialized by the SSB location index with $$c_{init}=2^{11}(\bar{i}_{SSB,location}+1)(\lfloor N_{ID}^{cell}/4 \rfloor+1)+2^{6}(\bar{i}_{SSB,location} 30\ 1)+(N_{ID}^{cell} \bmod 4)$$

$$\bar{i}_{SSB,location}=i_{SSB,location}+4n_{hf}$$

where, for $L_{max}$4, $n_{hf}$ is the number of the half-frame in which the PBCH is transmitted in a frame with $n_h=0$ for the first half-frame in the frame and $n_{hf}=1$ for the second half-frame in the frame, and $i_{SSB,location}$ is the two least significant bits of the SSB block location index.

for $L_{max}=8$ or $L_{max}=64$, $n_{hf}=0$ and $i_{SSB,location}$ is the three least significant bits of the SSB block location index.

Figure 21:
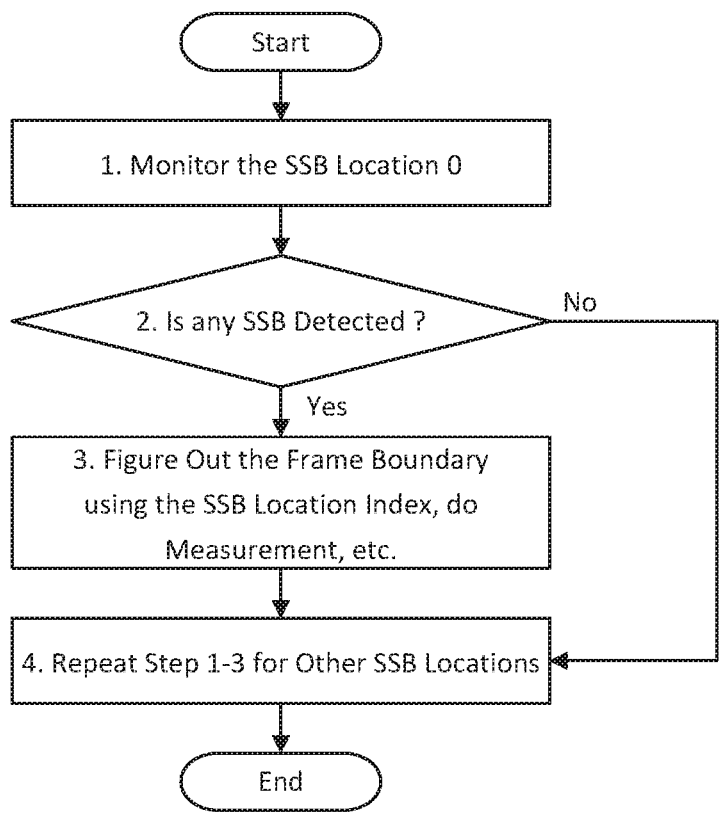
FIG. 21 illustrates procedures for monitoring and receiving the SSB transmission with flexible index order according to an aspect of the application.

In this case, the PBCH payload may be different for the same SSB index in different SSB transmissions. A UE may use the SSB block location index to determine the frame boundary. Furthermore, if STTC is used to enhance the SSB transmission, for initial cell selection, a UE in idle state or inactive state may assume some fixed STTC, e.g., duration, as pre-defined in the spec. The UE may determine the frame boundary based on the pre-defined STTC, detected SSB transmission offset A, SSB block location index etc. For a UE in connected state, the UE may be configured with the STTC by one or more of the RRC signaling and MAC CE. The UE may determine the frame boundary based on the pre-defined/configured STTC, detected SSB transmission offset A, SSB location index etc. An exemplary embodiment of the procedure for monitoring and receiving the SSB transmission with flexible index order is illustrated in FIG. 21.

The solutions proposed for indicating the offset Δ may also be applied here to indicate the SSB block location index.

Impact on Configurations and Scheduling when DRS/SSB Slides within the STTC

Figure 22A:
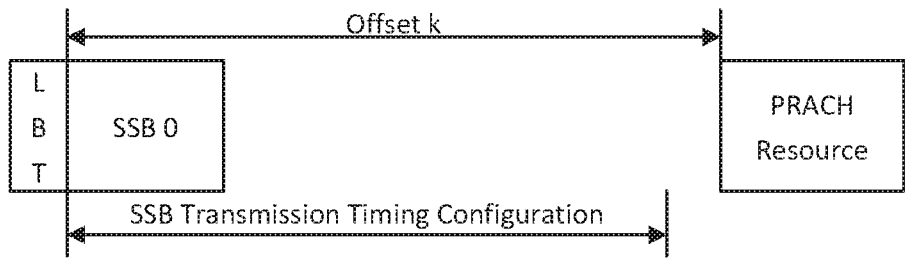
FIGS. 22A-C illustrate impacts of SSB shifting on RACH resources according to an aspect of the application.
Figure 22B:
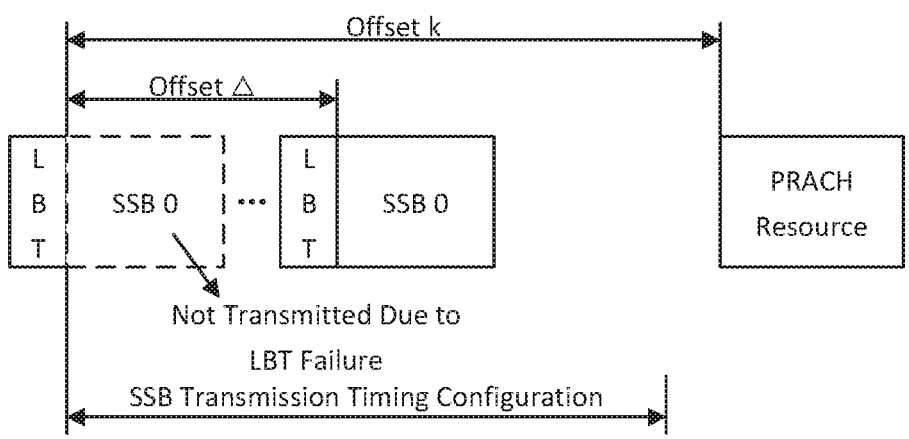

According to yet even another aspect of the application, when a STTC is used for SSB transmission, the SSB transmission may be shifted in the timing window. If the SSB transmission is shifted, it may overlap with other configurations or scheduling such as semi-persistent scheduling or PRACH resources. In this scenario, the following options are envisaged:

Option 1: When a UE detects the SSB transmission is shifted, the UE may assume the other configuration and/or scheduling are not shifted. An example of the impact of the SSB shifting on the PRACH resource is exemplary shown in FIGS. 22A-C. These illustrations show scenarios where the SSB 0 is transmitted on the schedule location. The timing difference between the SSB 0 transmission and the corresponding PRACH resource is denoted as offset k. FIG. 22B shows the scenario where the SSB 0 transmission is shifted by Δ due to the LBT failure at the scheduled location. The PRACH resource is not shifted. As a result, the timing difference between the SSB transmission and corresponding PRACH resource becomes k−Δ.

If k−Δ is smaller than the time a UE needs to switch from Dl to UL, the UE may drop the PRACH. A UE may first determine the frame boundary using the achieved SSB index and SSB transmission offset A. Then, the UE may perform PRACH procedure at the configured RACH resource (same location) regardless of whether the SSB transmission shifts. If a UE missed the first PRACH resource due to the SSB shifting, it may perform the RACH procedure at the next available PRACH resource. The same rationale may also apply to the paging indication (PI), semi persistent resources, etc. If the SSB overlaps with other transmissions, such as other reference signals or data due to the shifting, the other transmission may be dropped, punctured by the SSB, or rate matched around the SSB.

Figure 22C:
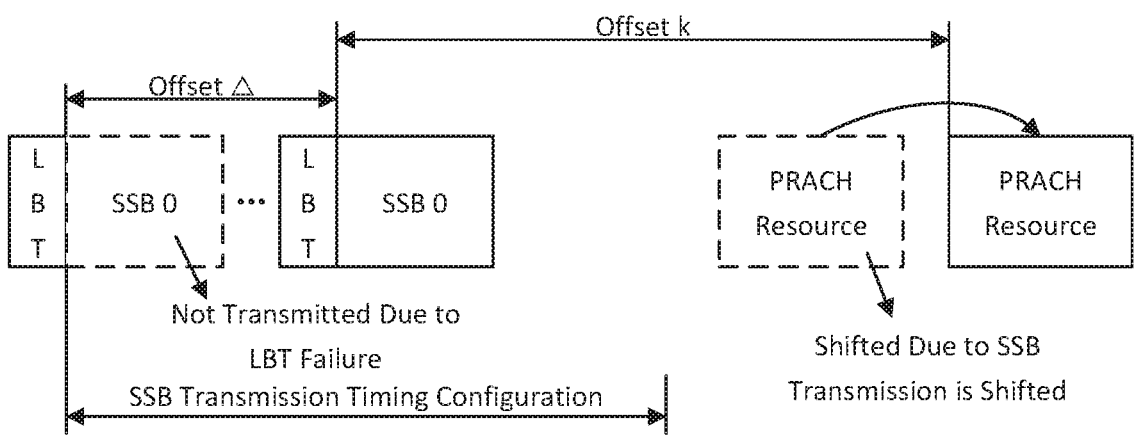

Option 2: When a UE detects the SSB transmission has shifted, the UE may assume the other configuration and/or scheduling has shifted, respectively. An exemplary embodiment depicting the impact of SSB shifting on the PRACH resource is shown in FIG. 22C. When the SSB 0 transmission is shifted by Δ due to LBT failure at the scheduled location, the PRACH resource may be also shifted. For example, the PRACH resource is also shifted by Δ. In so doing, the timing difference between the reception of the SSB 0 and PRACH resource is not changed, e.g., still is offset k.

When the PRACH is shifted, it may follow one of the following alternatives:

Alternative 1: Shifting of the PRACH may be implicitly indicated by the shifting of the SSBs transmission. When a UE determines the SSB transmission is shifted and determine SSB transmission offset A. The UE may automatically apply the same offset to the timing location for the PRACH procedure. After a UE determines the configured RACH resources through the higher-layer parameter PRACHConfigurationIndex, the UE may perform the PRACH procedure with additional offset rather than the configured location. For instance, if the configured PRACH resource is located at timing t, the UE may transmit message 1 at the location t+Δ.

Alternative 2: Shifting of the PRACH may be explicitly indicated. For example, higher-layer parameter PRACHConfigurationOffset may be used to indicate the UE how much offset should be added to the PRACH resource timing location. The value of PRACHConfigurationOffset and the value of the SSB transmission offset Δ may be same or may be different. Assume the PRACHConfigurationOffset is set to be A' and the configured PRACH resource is located at timing t, the UE may transmit the message 1 at the location t+Δ'.

The same idea may also apply to the paging indication (PI), semi persistent resources, etc. If the SSB is overlapped with other transmissions such as other reference signals or data due to shifting, the other transmission may be dropped, punctured by the SSB, or rate matched around the SSB.

Figure 23:
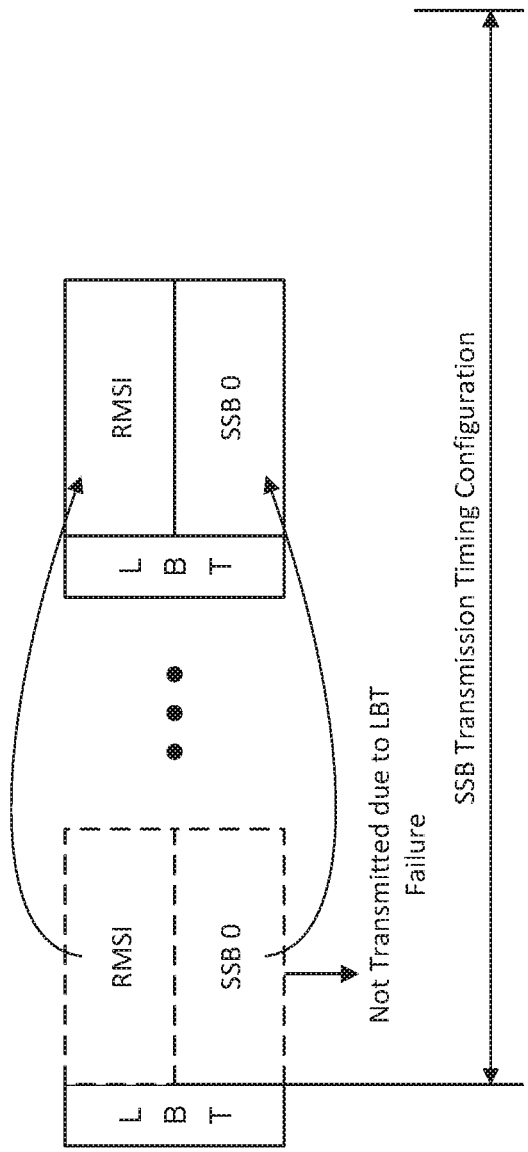
FIG. 23 illustrates an impact of SSB shifting on FDM-ed resources according to an aspect of the application.

This solution may work well for the configuration that is FDM-ed with the SSB. An example is shown in FIG. 23. If the RMSI is FDM-ed transmitted with the SSB, it will respectively shift if the SSB shifts.

According to the present disclosure, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, transit device or the like, perform and/or implement the systems, methods and processes described herein. Specifically, any of the steps, operations or functions described above may be implemented in the form of such computer executable instructions. Computer readable storage media includes volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

Figure 1F:
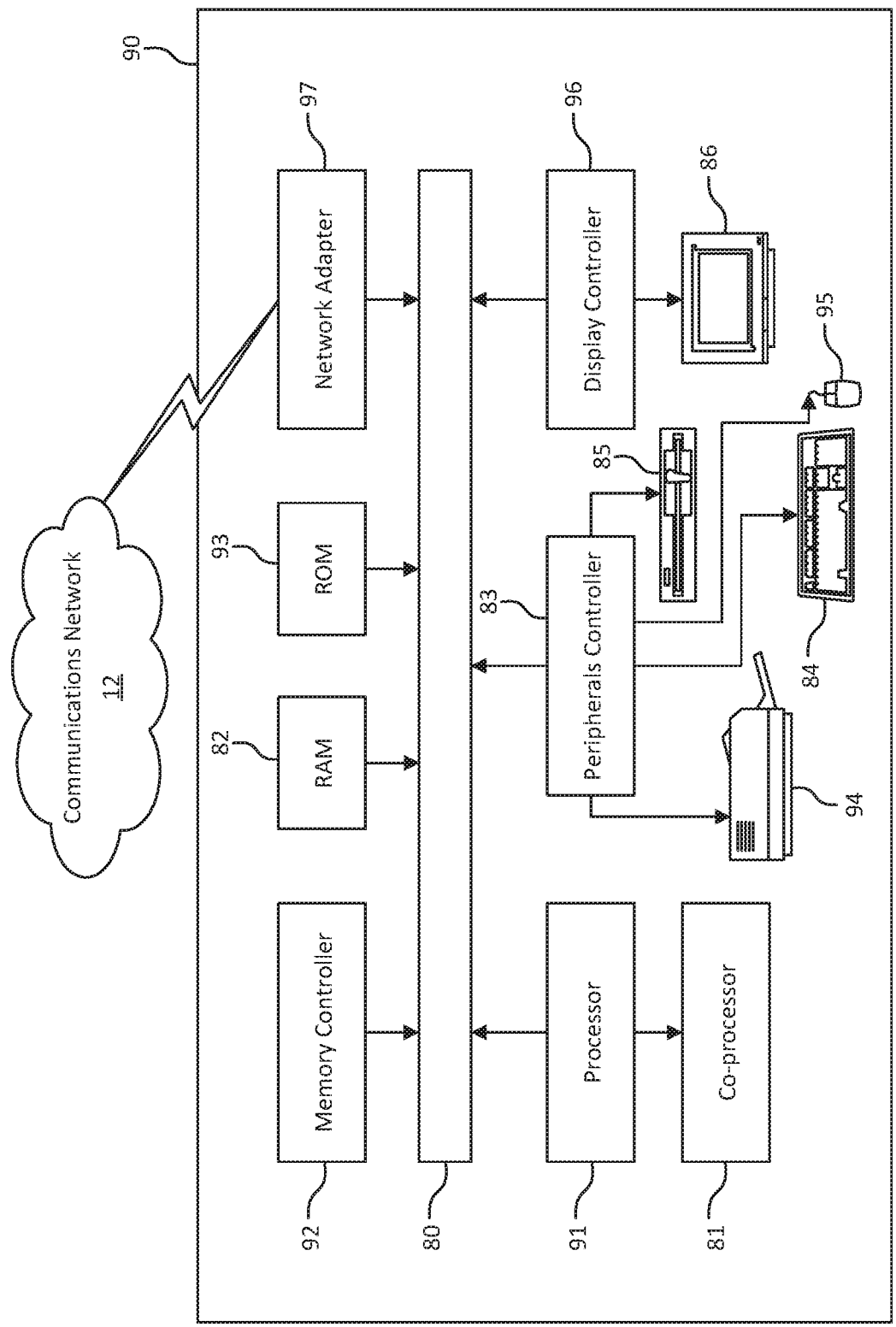
FIG. 1F illustrates a block diagram of an exemplary computing system in communication with one or more networks previously shown in FIGS. 1A, 1C, 1D and 1E according to an embodiment of the application.

According to yet another aspect of the application, a non-transitory computer-readable or executable storage medium for storing computer-readable or executable instructions is disclosed. The medium may include one or more computer-executable instructions such as disclosed above in the plural call flows. The computer executable instructions may be stored in a memory and executed by a processor disclosed above in FIGS. 1C and 1F, and employed in devices including a node such as for example, end-user equipment.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A wireless transmit/receive unit comprising:
a non-transitory memory including instructions stored thereon for monitoring synchronous signal blocks (SSBs) in unlicensed spectrum; and
a processor, operably coupled to the non-transitory memory, configured to execute the instructions of:
determining a length of an SSB transmission timing window, wherein the length of the SSB transmission timing within is determined based on a received an SSB transmission timing configuration (STTC) on condition that the STTC is received from a network node, and the SSB transmission timing window is determined to be predefined length of 5 ms on condition that the STTC is not received from the network node;
monitoring for the SSBs based on the STTC in accordance with the SSB transmission timing window;
receiving at least one SSB in the SSB transmission timing window; and
receiving a physical broadcast channel (PBCH) demodulation reference signal (DMRS) and a PBCH payload;
determining an offset based on the PBCH DMRS and the PBCH payload; and
determining a frame boundary based on information indicating the offset of the received SSB.

2. The wireless transmit/receive unit of claim 1, wherein the processor is further configured to execute the instructions of determining, from among the SSBs, a second SSB in the STTC at a second scheduled location.

3. The wireless transmit/receive unit of claim 1, wherein the information is indicated via a physical broadcast channel (PBCH), payload of the PBCH and an initialization of a PBCH demodulation reference signal (DMRS) sequence.

4. The wireless transmit/receive unit of claim 3, wherein the processor is further configured to execute the instructions of:
receiving an SSB index of the SSB transmission in the STTC.

5. The wireless transmit/receive unit of claim 4, wherein the SSB index is based upon one or more of a payload of a physical broadcast channel and a physical broadcast channel demodulation reference signal, and
wherein the processor is further configured to execute the instructions of determining a radio frame boundary based upon the offset and an SSB block index.

6. The wireless transmit/receive unit of claim 3, wherein the STTC is fixed for initial cell selection for the network node.

7. The wireless transmit/receive unit of claim 3, wherein the processor is further configured to execute the instructions of determining a radio frame boundary based upon the offset and an SSB block index.

8. The wireless transmit/receive unit of claim 3, wherein an available channel is in an unlicensed spectrum.

9. The wireless transmit/receive unit of claim 1, wherein a time duration of the STTC is configured via radio resource control (RRC) signaling.

10. A method implemented by a wireless transmit/receive unit, the method comprising:
determining a length of an SSB transmission timing window, wherein the length of the SSB transmission timing within is determined based on a received an SSB transmission timing configuration (STTC) on condition that the STTC is received from a network node, and the SSB transmission timing window is determined to be predefined length of 5 ms on condition that the STTC is not received from the network node;
monitoring for the SSBs based on the STTC in accordance with the SSB transmission timing window;
receiving at least one SSB in the SSB transmission timing window;
receiving a physical broadcast channel (PBCH) demodulation reference signal (DMRS) and a PBCH payload;
determining an offset based on the PBCH DMRS and the PBCH payload; and
determining a frame boundary based on information indicating the offset of the received SSB.

11. The method of claim 10, further comprising:
determining, from among the SSBs, a second SSB in the STTC at a second scheduled location.

12. The method of claim 10, wherein the information is indicated via a physical broadcast channel (PBCH), payload of the PBCH and an initialization of a PBCH demodulation reference signal (DMRS) sequence.

13. The method of claim 12, further comprising:
receiving an SSB index of the SSB transmission in the STTC.

14. The method of claim 13, wherein the SSB index is based upon one or more of a payload of a physical broadcast channel and a physical broadcast channel demodulation reference signal, and further comprising:
determining a radio frame boundary based upon the offset and an SSB block index.

15. The method of claim 12, wherein the STTC is fixed for initial cell selection for the network node.

16. The method of claim 12, further comprising:
determining a radio frame boundary based upon the offset and an SSB block index.

17. The method of claim 12, wherein an available channel is in an unlicensed spectrum.

18. The method of claim 10, wherein a time duration of the STTC is configured via radio resource control (RRC) signaling.

19. A wireless transmit/receive unit (WTRU) comprising:
a processor and memory, wherein the processor and memory are configured to:

determine a length of an SSB transmission timing window, wherein the length of the SSB transmission timing within is determined based on a received an SSB transmission timing configuration (STTC) on condition that the STTC is received from a network node, and the SSB transmission timing window is determined to be predefined length of 5 ms on condition that the STTC is not received from the network node;

monitor for the SSBs based on the STTC in accordance with the SSB transmission timing window;

receive at least one SSB in the SSB transmission timing window;

receive a physical broadcast channel (PBCH) demodulation reference signal (DMRS) and a PBCH payload;

determine an offset based on the PBCH DMRS and the PBCH payload; and determine a frame boundary based on information indicating the offset of the received SSB.

20. The WTRU of claim 19, wherein the information is indicated via a physical broadcast channel (PBCH), payload of the PBCH and an initialization of a PBCH demodulation reference signal (DMRS) sequence.

\* \* \* \* \*